US009858053B2

(12) United States Patent
Lethin et al.

(10) Patent No.: US 9,858,053 B2
(45) Date of Patent: Jan. 2, 2018

(54) METHODS AND APPARATUS FOR DATA TRANSFER OPTIMIZATION

(71) Applicant: Reservoir Labs, Inc., New York, NY (US)

(72) Inventors: Richard A. Lethin, New York, NY (US); Allen K. Leung, New York, NY (US); Benoit J. Meister, New York, NY (US); David E. Wohlford, Portland, OR (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 14/181,201

(22) Filed: Feb. 14, 2014

(65) Prior Publication Data

US 2014/0165047 A1 Jun. 12, 2014

Related U.S. Application Data

(63) Continuation-in-part of application No. 12/365,780, filed on Feb. 4, 2009, now Pat. No. 8,661,422.

(60) Provisional application No. 61/065,294, filed on Feb. 8, 2008.

(51) Int. Cl.
*G06F 9/45* (2006.01)
*G06F 12/02* (2006.01)

(52) U.S. Cl.
CPC ............ *G06F 8/443* (2013.01); *G06F 12/023* (2013.01)

(58) Field of Classification Search
CPC .................................................. G06F 12/0866
See application file for complete search history.

(56) References Cited

U.S. PATENT DOCUMENTS

| 5,442,699 | A | 8/1995 | Arnold et al. |
| 5,442,797 | A | 8/1995 | Casavant et al. |
| 5,613,136 | A | 3/1997 | Casavant et al. |
| 5,742,814 | A | 4/1998 | Balasa et al. |
| 5,920,854 | A | 7/1999 | Kirsch et al. |
| 5,953,531 | A | 9/1999 | Megiddo et al. |
| 6,006,033 | A | 12/1999 | Heisch |
| 6,018,735 | A | 1/2000 | Hunter |
| 6,038,398 | A | 3/2000 | Schooler |
| 6,064,819 | A * | 5/2000 | Franssen et al. ............. 717/156 |
| 6,131,092 | A | 10/2000 | Masand |
| 6,279,113 | B1 | 8/2001 | Vaidya |
| 6,327,699 | B1 | 12/2001 | Larus et al. |

(Continued)

OTHER PUBLICATIONS

Ahmed et al, Synthesizing Transformations for Locality Enhancement of Imperfectly-nested Loops Nests, ACM ICS 2000, pp. 141-152.

(Continued)

*Primary Examiner* — Henry Tsai
*Assistant Examiner* — Juanito Borromeo
(74) *Attorney, Agent, or Firm* — Goodwin Procter LLP

(57) ABSTRACT

Methods, apparatus and computer software product for optimization of data transfer between two memories includes determining access to master data stored in one memory and/or to local data stored in another memory such that either or both of the size of total data transferred and the number of data transfers required to transfer the total data can be minimized. The master and/or local accesses are based on, at least in part, respective structures of the master and local data.

50 Claims, 10 Drawing Sheets

(56) References Cited

U.S. PATENT DOCUMENTS

| | | | |
|---|---|---|---|
| 6,338,057 | B1 | 1/2002 | Weeks |
| 6,651,246 | B1 | 11/2003 | Archambault et al. |
| 6,754,650 | B2 | 6/2004 | Cho et al. |
| 6,772,415 | B1 | 8/2004 | Danckaert et al. |
| 6,785,677 | B1 | 8/2004 | Fritchman |
| 6,792,546 | B1 | 9/2004 | Shanklin et al. |
| 6,880,087 | B1 | 4/2005 | Carter |
| 6,912,526 | B2 | 6/2005 | Akaboshi |
| 6,952,694 | B2 | 10/2005 | Mathur et al. |
| 6,952,821 | B2 * | 10/2005 | Schreiber ............... 717/151 |
| 7,086,038 | B2 | 8/2006 | Cronquist et al. |
| 7,185,327 | B2 | 2/2007 | Scales |
| 7,225,188 | B1 | 5/2007 | Gai et al. |
| 7,260,558 | B1 | 8/2007 | Cheng et al. |
| 7,594,260 | B2 | 9/2009 | Porras et al. |
| 7,634,566 | B2 | 12/2009 | Turner et al. |
| 7,707,321 | B2 * | 4/2010 | Lee ................. G06F 13/28 709/230 |
| 7,757,222 | B2 | 7/2010 | Liao et al. |
| 7,793,278 | B2 * | 9/2010 | Du et al. ............... 717/160 |
| 8,087,010 | B2 | 12/2011 | Eichenberger et al. |
| 8,108,845 | B2 | 1/2012 | Little et al. |
| 8,230,408 | B2 | 7/2012 | Eng |
| 8,250,550 | B2 | 8/2012 | Luszczek et al. |
| 8,255,890 | B2 | 8/2012 | Luszczek et al. |
| 8,307,347 | B2 | 11/2012 | Austin et al. |
| 2002/0021838 | A1 | 2/2002 | Richardson et al. |
| 2003/0097652 | A1 | 5/2003 | Roediger et al. |
| 2004/0034754 | A1 | 2/2004 | Schreiber |
| 2004/0068501 | A1 | 4/2004 | McGoveran |
| 2005/0114700 | A1 | 5/2005 | Barrie et al. |
| 2006/0048121 | A1 | 3/2006 | Blainey et al. |
| 2006/0048123 | A1 | 3/2006 | Martin |
| 2006/0085858 | A1 | 4/2006 | Noel et al. |
| 2007/0033367 | A1 | 2/2007 | Sakarda et al. |
| 2007/0074195 | A1 | 3/2007 | Liao et al. |
| 2007/0192861 | A1 | 8/2007 | Varghese et al. |
| 2008/0010680 | A1 | 1/2008 | Cao et al. |
| 2009/0037889 | A1 | 2/2009 | Li et al. |
| 2009/0083724 | A1 | 3/2009 | Eichenberger et al. |
| 2009/0119677 | A1 | 5/2009 | Stefansson et al. |
| 2009/0259997 | A1 | 10/2009 | Grover et al. |
| 2009/0307673 | A1 | 12/2009 | Eichenberger et al. |
| 2010/0050164 | A1 | 2/2010 | Van De Waerdt et al. |
| 2010/0162225 | A1 | 6/2010 | Huang et al. |

OTHER PUBLICATIONS

Ahmed et al, Tiling Imperfectly-nested Loop Nests, IEEE 2000,14 pgs.

Aho et al, Compilers: Principles, Techniques, & Tools, 2nd Edition, 2006, pp. 173-186.

Aho et al, Efficient String Matching: An Aid to Bibliographic Search, Communications of the ACM, vol. 18, No. 6, Jun. 1975, pp. 333-340.

Aigner et al, An Overview of the SUIF2 Compiler Infrastructure, Computer Systems Laboratory, Standford University, 1999, pp. 1-14.

Aldwairi et al, Configurable String Matching Hardware for Speeding Up Intrusion Detection, ACM SIGARCH Computer Architecture News, Vo. 33, No. 1, Mar. 2005, pp. 99-107.

Allen et al, Conversion of Control Dependence to Data Dependence, ACM 1983, pp. 177-189.

Ancourt et al, Scanning Polyhedra with DO Loops, Proceedings of the third ACM SIGPLAN symposium on Principles and practice of parallel programming, Apr. 21-24, 12 pgs. 1991.

Appel, A.W., Deobfuscation is in NP, Princeton University, Aug. 21, 2002, 2 pgs.

Ayers et al, Aggressive Inlining, PLDI '92 Las Vegas, NV, USA.

Ball et al, Branch Prediction for Free, Technical Report #1137, University of Wisconsin, 1993, 29 pgs.

Barak et al, On the (Im)possibility of Obfuscating Programs, Advances in Cryptology, CRYPTO 2001, vol. 2139, pp. 1-18.

Barthou et al, Maximal Static Expansion, International Journal of Parallel Programming, vol. 28, No. 3, 2000, 20 pgs.

Bastoul et al, Putting Polyhedral Loop Transformations to Work, INRIA, No. 4902, Jul. 2003.

Bastoul, C., Generating Loops for Scanning Polyhedra: CLooG User's Guide, First Version, Rev. 1.6, Apr. 8, 2004, pp. 1-30.

Bastoul, Code Generation in the Polyhedral Model Is Easier Than You Think, Proceedings of the 13th International Conference on Parallel Architecture and Compilation Techniques, 2004.

Bastoul, Efficient Code Generation for Automatic Parallelization and Optimization, Proceedings of the Second International Symposium on Parallel and Distributed Computing, 2003.

Bednara et al, Synthesis for FPGA Implementations From Loop Algorithms, In Proceedings ofthe Int. Conf. on Engineering of Reconfigurable Systems and Algorithms (ERSA), Jun. 2001.

Berkelaar et al, The IpSolve Package, Sep. 21, 2007, pp. 1-9.

Bik et al, Implementation of Fourier-Motzkin Elimination, Technical Report 94-42, Department. of Computer Science, Leiden University, 1994.

Bondhugula et al, A Practical and Fully Automatic Polyhedral Program Optimization System,OSU OSU-CISRC-10/07-TR70; Dec. 14, 2007.

Bondhugula et al, A Practical Automatic Polyhedral Parallelizer and Locality Optimizer, PDLI '08, Jun. 7-13, 2008.

Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.

Bondhugula et al, Automatic Mapping of Nested Loops to FPGAs, OSU, Mar. 19, 2007.

Bondhugula et al, Toward Effective Automatic Parallelization for Multi\par core Systems, In proceeding of 22nd IEEE International Symposium on Parallell and Distributed Processing, (IPDPS 2008). Miami, Florida USA, Apr. 14, 2008.

Boulet et al, (Pen)-ultimate tiling?, Laboratoire de l'Informatique du Parallelisme, Research Report No. 93-96, Nov. 1993, pp. 1-17.

Boulet et al, Scanning polyhedra without Do-loops, Parallel Architectures and Compilation Techniques, 1998, Proceedings 1998 International Conference on Oct. 12-18, 1998, pp. 4-11.

Briggs et al, Effective Partial Redundancy Elimination, Sigplan PLDI, Jun. 1994, pp. 1-12.

Brumley et al, Towards Automatic Generation of Vulnerability-Based Signatures, Proceedings of the 2006 IEEE Symposium on Security and Privacy, pp. 1-15.

Buluc et al, Parallel Sparse Matrix-Matrix Multiplication and Indexing: Implementation and Experiments, SIAM Journal of Scientific Computing (SISC), 2012.

Burger et al, Scaling to the End of the Silicon with EDGE Architectures, Computer, Jul. 2004, pp. 44-55.

Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.

Chang et al, Parallel sparse supports for array intrinsic functions of Fortran 90, J. Supercomput. 18(3):305-339, (2001).

Cifuentes, C., A Structuring Algorithm for Decompilation, XIX Conferencia Latinoamericana de Inforamatica, Buenos Aires, Argentina, Aug. 2-6, 1993, pp. 267-276.

Cifuentes,Structuring Decompiled Graphs, Department of Computer Science, University of Tasmania, 1994, 15 pgs.

Clauss et al, Automatic Memory Layout Transformations to Optimize Spatial Locality in Parameterized Loop Nests, ACM SIGARCH Computer Architecture News, vol. 28, No. 1, 2000, pp. 1-9.

Clauss et al, Deriving Formulae to Count Solutions to Parameterized Linear Systems using Ehrhart Polynomials: Applications to the Analysis of Nested-Loop Programs, Apr. 10, 1997.

ClearSpeed—Accelerator Technology Primer, ClearSpeed Technology Primer, ClearSpeed Technology, Inc., 2006.

ClearSpeed—ClearSpeed Programming Model: An introduction, ClearSpeed Technology Inc. 2007.

(56) References Cited

OTHER PUBLICATIONS

ClearSpeed—ClearSpeed Programming Model: Card-side Libraries, ClearSpeed Technology Inc. 2007.
ClearSpeed—ClearSpeed Programming Model: Optimizing Performance, ClearSpeed Technology Inc. 2007.
ClearSpeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Introduction to ClearSpeed Acceleration, Powerpoint presentation, ClearSpeed Technology Plc, 2007, 133 pgs.
ClearSpeed—Overview of Architecture: System Level (host) Architecture and ClearSpeed Architecture, ClearSpeed Technology Inc., 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.
ClearSpeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and The Control Dependence Graph, Mar. 7, 1991, pp. 1-52.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Darte et al, Scheduling and Automatic Parallelization, Chapter 5: Parallelelism Detection in Nested Loops, Birkhauser Boston, 2000, pp. 193-226.
Davis, Direct Methods for Sparse Linear Systems. SIAM, 2006 (100 pgs.).
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh, 2001.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau, 2002.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Technical Report MIP-0009, Fakultät für Mathematik und Informatik, Universität Passau, Germany, 2000.
Gu et al, Symbolic Array Dataflow Analysis for Array Privatization and Program Parallelization, Proceedings of Supercomputing '95, pp. 1-19, 1995.
Gundersen et al, Sparsity in higher order methods for unconstrained optimization, Optimization Methods and Software, 27(2):275-294 (2012).
Gustafson et al, ClearSpeed—Whitepaper: Accelerating the Intel® Math Kernel Library, ClearSpeed Technology Inc., 2006.
Gustavson, Two Fast Algorithms for Sparse Matrices: Multiplication and Permuted Transposition, ACM Transactions on Mathematical Software, 4(3): 250-269, 1978.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Preliminary Report on Patentability dated Jan. 6, 2009 for PCT Application No. PCT/US2007/72260.
International Preliminary Report on Patentability dated Mar. 31, 2011 for PCT Application No. PCT/US2009/057194.
International Preliminary Report on Patentability dated Oct. 27, 2011 for PCT Application No. PCT/US2010/031524.
International Preliminary Report on Patentability dated Nov. 1, 2011 for PCT Application No. PCT/US2010/033049.
International Search Report and the Written Opinion dated Jan. 17, 2008 for PCT Application No. PCT/US2007/72260.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.

(56) References Cited

OTHER PUBLICATIONS

JGAP Frequently Asked Questions, Sourceforge.net, Accessed 2007, pp. 1-61.
Jimenez et al, Register Tiling in Nonrectangular Iteration Spaces, ACM Transactions on Programming Languages and Systems, vol. 24, No. 4, pp. 409-453, Jul. 2002.
Jonsson et al., Verifying Safety Properties of a Class of Infinite-State Distributed Algorithms, Lecture Notes in Computer Science, 1995, vol. 939, pp. 42-53.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Kolda et al, Scalable Tensor Decompositions for Multiaspect Data Mining, in ICDM 2008: Proceedings of the 8th IEEE International Conference on Data Mining, Dec. 2008, pp. 363-372.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Lathauwer et al, On the Best Rank-1 and Rank-(R1,R2, . . . ,RN) Approximation of Higher-Order Tensors, SIAM J. Matrix Anal. Appl., 21:1324-1342, Mar. 2000.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2006, 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Lin et al, Efficient data compression methods for multidimensional sparse array operations based on the EKMR scheme, IEEE Trans. Comput., 52(12):1640-1646, (2003).
Lin et al, Efficient Representation Scheme for Multidimensional Array Operations, IEEE Transactions on Computers, 51:327-345, 2002.
Loechner et al, Precise Data Locality Optimization of Nested Loops, The Journal of Supercomputing, 21, pp. 37-76, 2002.
Mahajan et al., Zchaff2004: An Efficient SAT Solver, LNCS, 2005, pp. 360-375.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 2001, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, Dec. 2007, 40 pgs.
Reservoir Labs, Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Intrusion Detection Systems, Proc. SPIE 7709, Cyber Security, Situation Management, and Impact Assessment II; and Visual Analytics for Homeland Defense and Security II, 770909 (Apr. 28, 2010), 8 pgs.
Ros-Girolt et al, Compilation and Optimization of Protocol Analyzers for High-Speed Network Intrusion Prevention, High Performance Networks / High-Speed Network Security Systems, Topic No. 41 b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.

(56) References Cited

OTHER PUBLICATIONS

Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Cell Roadmap, Published on PPCNUX at http://www.ppcnux.com/?q=print/6666, Accessed 2006.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, Mar. 2009, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Vera et al, An Accurate Cost Model for Guiding Data Locality Transformations—Politecnica de Catalunya-Barcelona University—Sep. 2005.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.
Wolf et al, A Data Locality Optimizing Algorithm, Proceedings of the ACM SIGPLAN '91 Conference on Programming Language Design and Implementation, Jun. 26-28, 1991, pp. 30-44.
Wu et al, Static Branch Frequency and Program Profile Analysis, 27th IEEE/ACM International Symposium on Microarchitecture (MICRO-27), 1994, 11 pgs.
Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.
Xue, On Tiling as a Loop Transformation, Department of Mathematics, Statistics and Computing Science, University of New England, Australia, 1997, 15 pgs.
Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.
Aloul et al, Solution and Optimization of Systems of Pseudo-Boolean Consraints, IEEE Transactions on Computers, vol. 56, No. 1 0, Oct. 2007, pp. 1415-1424.
Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.
Chavarria-Miranda, "Advanced data-parallel compilation." Ph.D. Dissertation, Rice University (2004).
Chavarria-Miranda , et al., "Effective Communication Coalescing for Data Parallel Applications," Proceedings of the Tenth ACM SIGPLAN Symposium on Principles and Practice of Parallel Programming, pp. 14-25, ACM, New York (2005).
Chen, et al., "Communication Optimizations for Fine-Grained UPC Applications," Proceedings of the 14th International Conference on Parallel Architectures and Compilation Techniques (PACT '05), pp. 267-278 (2005), IEEE Computer Society, Washington, DC, USA.
Dathathri, et al., "Generating Efficient Data Movement Code for Heterogeneous Architectures with Distributed-Memory," Proceedings of the 22nd International Conference on Parallel Architectures and Compilation Techniques, pp. 375-386, Edinburgh, 2013.
Manish Gupta, et al., "A Methodology for High-Level Synthesis of Communication on Multicomputers," Proceedings of the 6th International Conference on Supercomputing (ICS '92), pp. 357-367, ACM, New York, NY, USA (1992).
Iancu, et al., "Performance Portable Optimizations for Loops Containing Communication Operations," 16th International Conference on Parallel Architecture and Compilation Techniques (PACT 2007), pp. 411-411, Brasov, 2007.

* cited by examiner

METHODS AND APPARATUS FOR DATA TRANSFER OPTIMIZATION

CROSS REFERENCE TO RELATED APPLICATIONS

This application is a continuation-in-part of U.S. patent application Ser. No. 12/365,780, entitled "Methods And Apparatus For Local Memory Compaction," filed on Feb. 4, 2009, which is related to and claims the benefit of priority to U.S. Provisional Application Ser. No. 61/065,294, entitled "SYSTEM, APPARATUS, AND METHODS FOR SOURCE CODE COMPILATION", filed Feb. 8, 2008, each of which is incorporated herein by reference in its entirety.

GOVERNMENT INTEREST

Portions of this invention were made with U.S. Government support under contract/instrument DARPA F03602-03-C-0033 with the U.S. Air Force Research Laboratory and DARPA. The U.S. Government has certain rights.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads per processing core. One limitation that these architectures experience is that the current commercially available compilers cannot efficiently take advantage of the increase of computational resources.

In the software design and implementation process, compilers are responsible for translating the abstract operational semantics of the source program into a form that makes efficient use of a highly complex heterogeneous machine. Multiple architectural phenomena occur and interact simultaneously; this requires the optimizer to combine multiple program transformations. For instance, there is often a trade-off between exploiting parallelism and exploiting locality to reduce the "memory wall", i.e., the ever widening disparity between memory bandwidth and the frequency of processors. Indeed, the speed and bandwidth of the memory subsystems are a performance bottleneck for the vast majority of computers, including single-core computers. Since traditional program optimization problems are associated with huge and unstructured search spaces, this combinational task is poorly achieved by current compilers, resulting in poor scalability of the compilation process and disappointing sustained performance of the supposedly optimized program.

Even when programming models are explicitly parallel (threads, data parallelism, vectors), they usually rely on advanced compiler technology to relieve the programmer from scheduling and mapping the application to computational cores, and from understanding the memory model and communication details. Even provided with enough static information and code annotations (OpenMP directives, pointer aliasing, separate compilation assumptions), traditional compilers have a hard time exploring the huge and unstructured search space associated with the mapping and optimization challenges. Indeed, the task of the compiler can hardly be called "optimization" anymore, in the traditional meaning of reducing the performance penalty entailed by the level of abstraction of a higher-level language. Together with the run-time system (whether implemented in software or hardware), the compiler is responsible for most of the combinatorial code generation decisions to map the simplified and ideal operational semantics of the source program to a highly complex and heterogeneous target machine.

Generating efficient code for deep parallelism and deep memory hierarchies with complex and dynamic hardware components is a difficult task. The compiler (along with the run-time system) now has to take the burden of much smarter tasks, that only expert programmers would be able to carry. In order to exploit parallelism, the first necessary step is to compute a representation which models the producer/consumer relationships of a program as closely as possible. The power of an automatic optimizer or parallelizer greatly depends on its capacity to decide whether two portions of the program execution may be run one after another on the same processing element or on different processing elements, or at the same time ("in parallel"). Such knowledge is related to the task of dependence analysis which aims at precisely disambiguating memory references. One issue is to statically form a compact description of the dynamic properties of a program. This process is generally undecidable and approximations have to be made.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs.

Traditional optimizing compilers perform syntactic transformations (transformations based on a representation that reflects the way the program source code text was written, such as the Abstract Syntax Tree), making the optimizations brittle since they are highly dependent on the way that the input program is written, as opposed to the more abstract representation of the program's execution offered by the polyhedral model. Moreover, syntactic transformations are not amenable to global optimizations, since the problem of optimally ordering elementary syntactic transformations is yet unsolved. Many interesting optimizations are also not available, such as fusion of loops with different bounds or imperfectly nested loop tiling.

In some situations, such as in high performance signal and image processing, the applications may primarily operate on "dense" matrices and arrays. This class of applications primarily consists of do-loops with loop bounds which are affine functions of outer indices and parameters, and array indexing functions which are affine functions of loop indices and parameters. Other classes of programs can be approximated to that class of programs.

One significant area of concern in these large scale systems is memory management. For example, in a program, a large multi-dimensional array may be allocated and used to store data. This large block of data is typically stored in memory in contiguous memory cells. Certain operations on the array may not access all portions of the data. For example, in nested loops an outer loop may be indexed by the column of the array and an inner loop may be indexed by the rows of the array. In a situation where the loop operation only accesses a portion of the elements of the array, it would be inefficient to transfer the entire array to a processing element that is assigned the access task. Further, since portions of the array are not accessed, the loop indices may be rewritten for local access on a processing element.

There have been a number of approaches used to implement these program transformations. Typical goals of these approaches include reducing the memory size requirements to increase the amount of useful data in local memory and to reduce communication volumes. One such algorithm is described in U.S. Pat. No. 6,952,821 issued to Schreiber. Schreiber's method is applicable to non-parametric rectangular iteration spaces and employs the Lenstra-Lenstra-Lovasz (LLL) lattice basis reduction algorithm. Schreiber's methods are additionally incapable of addressing data with non-convex sets of accessed data.

Therefore a need exists for more efficient compiler architectures that optimize the compilation of source code.

SUMMARY OF THE INVENTION

The present invention provides a system, apparatus and methods for overcoming some of the difficulties presented above. Various embodiments of the present invention provide a method, apparatus, and computer software product for a class of automatic program transformations that reduce the memory size requirements by relocating and compressing the memory accesses of a program that includes loop nests with arbitrary affine indices. Exemplary methods extract a lattice of points within the iteration domain to handle iteration domains with strides, for which the values of loop counters differ by more than a unit for loop iterations executed consecutively. Other provided methods operate on programs that contain arbitrary affine array index functions; and in some instances where the program transformation handles arbitrarily complex data footprints.

An exemplary method includes receiving program source code containing loop nests with arbitrary parametric affine iteration domain containing at least one array. The method identifies inefficiencies in memory usage where the inefficiencies are related to access and the memory footprint of the arrays. The method further allocates at least one local array and maps a portion of the received arrays to one or more of the local arrays. The mapping reduces the memory size requirements and the memory footprint of the arrays.

A further embodiment provides a local memory compaction module that assists a processor in the optimization of source code. Other embodiments provide computing apparatus and computer software products that implement the described methods.

BRIEF DESCRIPTION OF THE DRAWINGS

Various embodiments of the present invention taught herein are illustrated by way of example, and not by way of limitation, in the figures of the accompanying drawings, in which.

Figure 1:
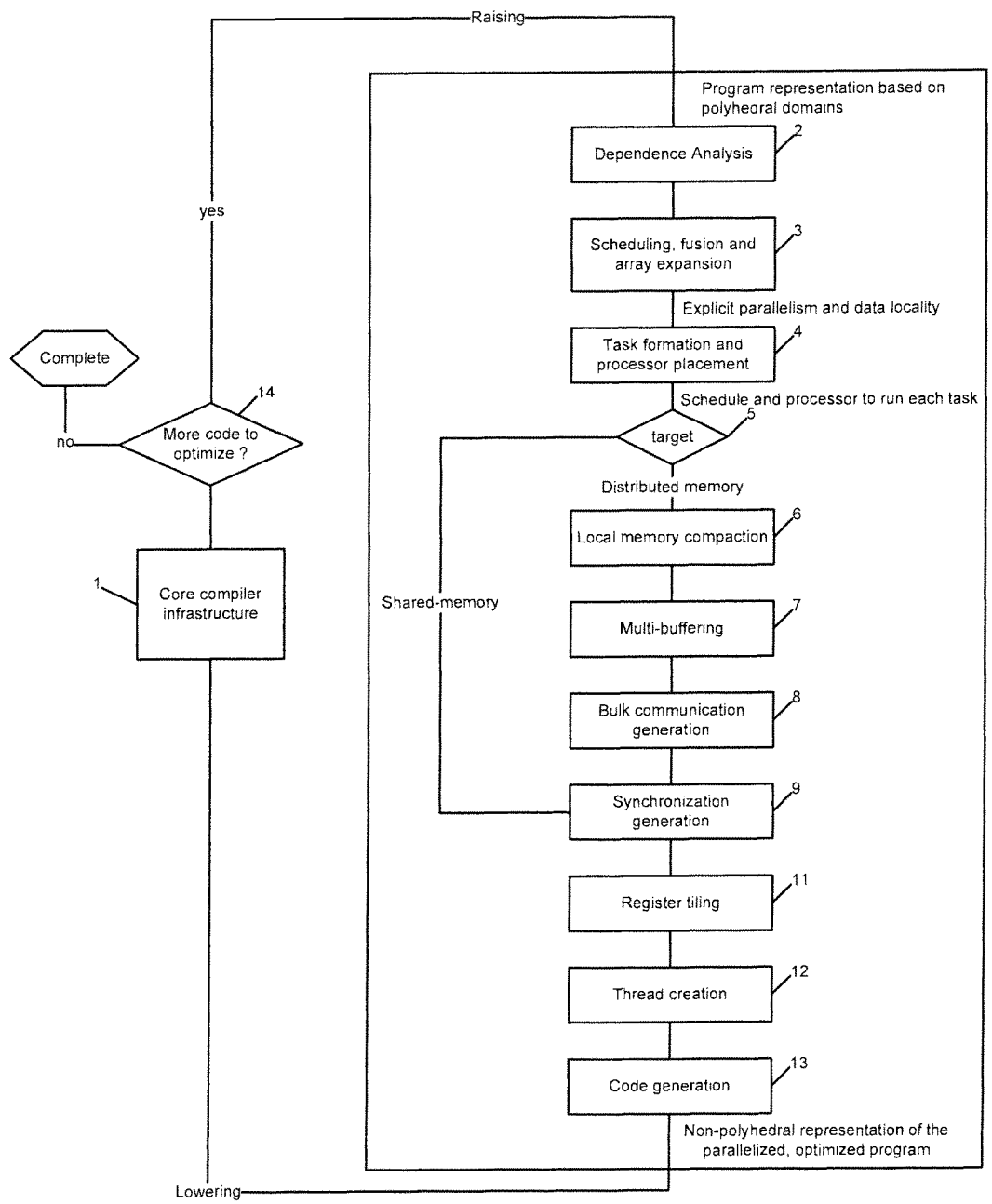
FIG. 1 is an overview of an exemplary compiler architecture consistent with provided embodiments.

It will be recognized that some or all of the figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The trend of increasing the frequency at which processors perform computations seems to have come to an end. Power consumption and control complexity have reached such high levels that manufacturers are backing out of this design path. Current machines have evolved to multiprocessor architectures on a chip with increasingly many cores per chip and multiple threads per core. This trend is expected to dramatically increase, reaching thousands of cores per chip in the next few years. Thus, modern computers increasingly need to exploit parallelism at different levels to provide sustained performance. On the other hand, parallel programming techniques have not evolved at the same speed and the gap between theoretical machine speed and actual utilization continues to increase.

Compilers are responsible for translating the abstract operational semantics of the source program, i.e., a text description of what the program's execution is supposed to perform, into an executable form that makes efficient use of a highly complex heterogeneous machine. Multiple architectural phenomena occur and interact simultaneously within the targeted computer during the execution of the program; this requires the optimizing compiler to combine multiple program transformations in order to define a program execution that takes advantage of those architectural phenomena. For instance, when targeting computers that have multiple processing elements (multi-core computers), there is often a trade-off between exploiting more processing elements simultaneously (parallelism) and exploiting data access locality to reduce memory traffic. Indeed, the speed and bandwidth of the memory subsystems are almost always a bottleneck. The problem is typically worse for multi-core computers. Since, in traditional compilers, optimization problems are associated with huge and unstructured search spaces, this combinational task is poorly achieved in general, resulting in poor scalability and disappointing sustained performance of the supposedly optimized program.

Generating efficient code for deep parallelism and deep memory hierarchies with complex and dynamic hardware components is a difficult task: the compiler (and run-time system) has to take the burden of tasks that only expert programmers would be able to carry. In order to exploit parallelism the first necessary step is to compute a representation which models the producer/consumer relationships of a program as closely as possible. The power of an automatic optimizer or parallelizer greatly depends on its capacity to decide whether two portions of the program execution may be interchanged or run in parallel. Such knowledge is related to the task of dependence analysis which aims at precisely disambiguating memory references. The issue is to statically form a compact description of the dynamic properties of a program. Forming a precise description is generally undecidable and approximations have to be made.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs. The polyhedral model is a representation of a program's structure particularly suited for expressing complex sequences of loop nests, complex sequences of loop nest transformations, and other relevant information such as for instance dependences, communications, and array layouts.

A polyhedron is defined as a set of points verifying a set of affine inequalities and equalities on a number of variables. There exist alternate but equivalent definitions for polyhedrons, such as the one based on a combination of vertices, rays and lines proposed by Minkowski. There are also alternate representations, often based on the alternate definitions. While the present disclosure teaches using one of those definitions and representations to illustrate the various embodiments, various embodiments are in no way restricted to a particular definition or representation.

A polyhedral domain is defined as a finite union of polyhedrons. One of the main interests in using polyhedral domains is that they provide a precise representation of sets and relations among sets, on which many optimization problems can be phrased and solved using a rich set of algorithms, which are mostly available in the literature. Some embodiments of the sets in question represent loop iterations, mono- and multi-dimensional data sets, sets of processing elements, data transfers, synchronizations, and dependences. Thus, essential characteristics of the execution of a program can be summarized into compact mathematical objects, polyhedrons, which can be manipulated and transcribed into an executable program that has desired execution properties.

By considering a subset of the variables of a polyhedron as symbolic constants, also called "parameters", it is possible to perform program optimizations and parallelization as a function of the symbolic constants. Hence, programs involving loops that depend on a constant value that is not known at the time when compilation is performed, but only when the program is executed, can be modeled using polyhedrons that are defined as a function of those constant values. A polyhedron involving parameters is called a parametric polyhedron. Similarly, a parametric polyhedral domain is defined by a finite union of parametric polyhedrons. For instance, the set of values that the counters of a loop nest reach during the execution of the loop nest is represented by the loop nest's "iteration domain". The iteration domain of the following loop nest (using the C language's syntax, where F is a C function call) can be written as the parametric domain $P(n)$: $\{(i, j) \in Z^2 | 5 \leq i \leq n; 0 \leq j \leq 10; j \leq i\}$:

```
for (i=5; i<=n; i++) {
    for (j=0; j<=i && j<=10; j++) {
        F(ij);
    }
}
```

The set of iterations of such a loop nest depends directly upon the value of the parameters. The parametric domain that represents the set of iterations is called a "parametric iteration domain". It has to be noted that the values of the loop counters are integer. Hence, the set of values of i and j also lie on a regular lattice of integer points (the standard lattice $Z^2$ in the current example). However, it is possible to represent the fact that a set belongs to a polyhedral domain as well as the fact that it also belongs to a regular lattice of points using polyhedral domains exclusively. While alternate, equivalent representations exist (for instance those based on "Z-polyhedrons", which are an explicit intersection of a polyhedral domain and a lattice of integer points), various embodiments of the present invention are in no way restricted to exclusively using polyhedral domains. The use parametric polyhedral domains as a means to illustrate various provided embodiments. In some embodiments, either or both polyhedrons and Z-polyhedrons can be used as a representation, and there exist conversion methods between both representations.

While most of the transformations applied to the polyhedral representation of a program are defined for any element of the polyhedral domain to transform, a class of more complex and precise transformations is obtained by partitioning the vector space in which the polyhedral domain is defined into sub-polyhedrons, and by defining a different transformation for each polyhedron of the partition. The resulting transformation is called a "piecewise" transformation. For example, consider the transformation that takes two numbers i and j and computes three numbers x, y, and z as: {x=2i+1; y=(i+j)/2; z=−3j+4} when i is greater than j and {x=i; y=i−j+3; z=2j} when i is less than or equal to j. It is a piecewise affine function since it has different definitions for each set of values, {i>j} and {i≤j}, which define a partition of the (i, j) vector space.

The context of various embodiments, the use of polyhedral representations to perform complex optimizations on programs, either independently or within a system of optimizing components. An exemplary embodiment of such a system is illustrated in FIG. 1, where it is described as being part of a compiler. Flow of the exemplary embodiment starts in block 1, where the compiler is processing a program. Flow continues in block 14, where the compiler analyzes the program to decide if there are portions of the program that should be optimized and mapped using a polyhedral system. If it is the case, the flow goes to block 2, where the compiler provides the system of optimizing components with a polyhedral representation of a portion of the program to be optimized. If not, the compiler continues to process the program without using the system of optimizing components and completes. The components of the system are in charge of a part of the global optimization of the input program. In the flow of the embodiment illustrated in FIG. 1, the polyhedral representation of the input code is analyzed in block 2 to produce dependence information. Flow continues in block 3 where such information is used in a local memory compaction component or module that modifies array layouts in a way that removes some dependencies, schedules loop iterations in a way that exposes loops that scan independent iterations, and schedules the execution of operations using a same data to be executed within a close time interval. Flow continues in block 4, where the modified polyhedral representation of the program is processed by another optimizing component, which partitions the represented loop operations into entities called tasks, which have good data locality properties (they access a data set that involves an optimized use of the memory subsystem of the target computer), and assigns a processing element of the target machine to each task. In this exemplary embodiment, the flow continues to decision block 5, which decides which block is next in the flow as a function of the target machine. If the target machine requires the execution of explicit communication commands to transfer data to and from its processing elements, flow goes to block 6, where the representation of the program thus modified is then processed by a series of optimizing modules which define a new layout for data that is transferred to a processing element's local memory. Otherwise, the flow goes to block 9. From block 6, flow continues to block 7, where a representation of the explicit communications is produced, based on polyhedrons, and then to block 8, where the execution of the communications are scheduled for parallel execution with the tasks, using multi-buffering. Whether the target machine requires explicit communications or not, the flow continues to block 9, where an optimizing component processes the polyhedral representation of the program obtained from the previous components by inserting a polyhedral representation of synchronization operations, which ensure that the execution of the modified program produces the same results or similar results as the original input program. The flow of the exemplary embodiment then goes to block 11, where an optimizing component partitions the tasks into subtasks whose execution reduces traffic between the processing elements' memories and their registers. Then, in block 12, a polyhedral representation of commands that trigger the execution of a series of tasks on the different processing elements of the target machine and that wait for the completion of those, is generated by the next optimizing component. Finally, in block 13, the polyhedral representation of the optimized program is transformed by polyhedral code generation component into a representation (Abstract Syntax Tree, high-level language code, or a compiler's internal representation) that can be either processed by a compiler or processed further by the user. In the exemplary embodiment, the flow continues back to block 1, where it may cycle again through the whole flow if there is more code to be optimized using the system of optimizing components.

In contrast to compilers based on polyhedral domains, traditional loop-oriented optimizing compilers typically perform syntactic transformations. As a result, many interesting optimizations are often not available, such as fusion of loops with different bounds or imperfectly nested loop tiling.

In some embodiments, the optimizing components or modules comprise processor executable code that when executed by a processor, convert source code into other forms of source code, or in some instances machine code. In other embodiments, various modules may be implemented in hardware such as monolithic circuits, Application Specific Integrated Circuits (ASIC), or Field Programmable Gate Arrays (FPGA). These modules may comprise software, hardware, firmware, or a combination of these implementations. It is important to note that various embodiments are illustrated in specific programming languages, these illustrations are mere examples and the scope is not therefore limited to any particular programming language.

Figure 2:
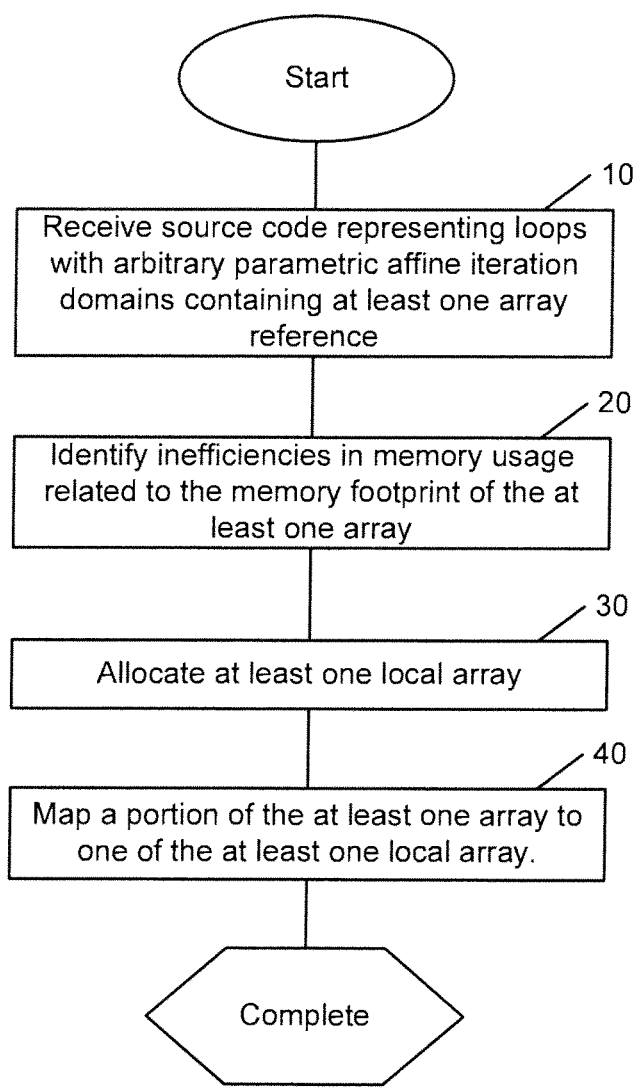
FIG. 2 illustrates the operational flow of one embodiment of a provided local memory compaction module.

Embodiments of a provided optimization module, described above as local memory compaction are illustrated in FIGS. 2-8. FIG. 2 illustrates the flow of a provided method for local memory compaction. Flow begins in block 10 where source code is received into memory. In this embodiment, the source code represents loops with arbitrary parametric affine iteration domain and contains at least one array reference. An array reference is an operation that represents an access, typically a read or a write, to an array. Such a reference represents, either explicitly or implicitly, for instance by using programming language conventions, a function to retrieve the memory address of an element of the array. In loop programs, that function is typically a direct or indirect function of the loop indices and of some loop-constant values. For instance, in C, arrays are typically referenced through mono- and multi-dimensional affine functions of some input values. In the C language, the declaration of an array includes parameters called "array size", which implicitly define the address of an array element as a function of the input values to references to this array, declaring "char A[100][200]" allocates an array of 20000 elements (100×200), named A, and defines that for any two integer values x and y, the memory address of the element of A referenced through A[x][y] is b+200x+y, where b is a value called the "base address" of array A. b is constant for each array and is determined at some point in the compilation process. Flow continues to block 20 where inefficiencies in memory usage in the at least one array are identified. In one embodiment, the inefficiencies are related to access and memory footprint of the array. Flow then continues to block 30 where at least one local array is allocated, and in block 40 a portion of the array with inefficient memory usage is mapped into the local array. The mapping portion of the module outputs code that is more efficient than the original code in terms of the memory size requirements of the local array versus the original array. In some embodiments the accessed data is arbitrarily complex. In further embodiments, the mapping produces a piecewise affine index function for the local arrays. Other embodiments include the rendering of a visualization of the optimized code on a monitor.

Arrays are typically allocated sets of contiguous memory blocks. Some loop operations may access only portions of the allocated memory. When reorganizing the data layout for a specific processor, there is an opportunity to take advantage of the inefficiencies in memory access requirements versus the actual utilization of the array. For example, given the following code fragment, 900,000 contiguous memory blocks are allocated, but only 100 are accessed in this operation. Furthermore, access to the array is not contiguous, but contains gaps, and thus will have less than optimal locality. Thus keeping the original data layout (and array size) in a remote processor is extremely inefficient. Moreover, if there are less than 900,000 blocks available in the local memory, the local memory cannot hold the entirety of the array and the program cannot be executed properly. In the provided code fragments, we are using to elude other operations which do not have any specific illustrative purpose.

```
double A[300][300];
for (i=0; i<100; i++) {
 . . . = . . . A[2*i+100][3*i]; }
```

One embodiment of a provided method, illustrated in FIG. 2, would map this code fragment into a local array with 100 elements. An exemplary mapping would produce the following pseudo-code fragment, in which the storage requirement of a local array is reduced from 300×300 elements to the optimal 100 elements.

```
double A_local[100]; //local memory
transfer A[2*i+100][3*i] to A_local[i], i=0, 1, . . . 99;
for (i=0; i<100; i++) {
 . . . = . . . A_local[i]; }
```

One feature of this embodiment is that it provides a method of compacting local memory in a computing apparatus. This method provides a more efficient memory structure in terms of both access to the elements and the amount of memory occupied by the data that is actually accessed. The memory requirements are reduced from the initial allocation to an allocation that is large enough to contain the data that is actually used in the operations. In contrast to other methods, the provided method handles loops whose iteration domains are non-rectangular, and loops that have a parametric iteration domain. In this document we refer to polyhedral iteration domains that are either non-rectangular or parametric or both as "arbitrary parametric iteration domains". In addition, the provided methods handle non-convex accessed data sets. The provided embodiments are very useful in image and video processing. Imaging applications typically utilize significant multi-dimensional arrays where data representations of physical objects and systems are stored. Many image processing steps, such as discrete wavelet transforms for example, only utilize discrete portions of the stored data. In these situations, various embodiments provide significant optimizations to local data storage.

Figure 3:
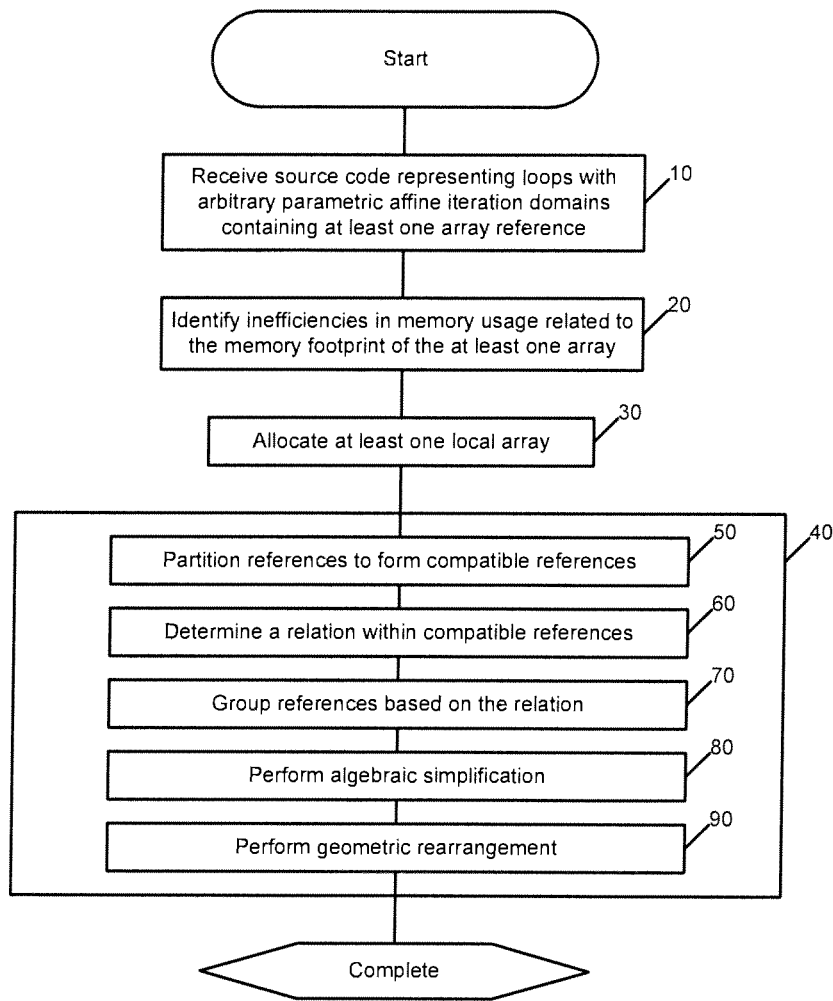
FIG. 3 illustrates the operational flow of another provided local memory compaction module, in which array references are partitioned into groups and algebraic and geometric data re-indexing functions are computed.

Another embodiment of a provided method is illustrated in FIG. 3. In this embodiment, flow begins in block 10 where source code is received in memory. Similar to the above embodiment, the source code contains loops with arbitrary parametric iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, mapping block 40 includes partitioning references to form compatible references in block 50; determining a relation within compatible references in block 60; grouping compatible references based on the relation in block 70; performing algebraic simplification in block 80; and performing geometric arrangement through re-indexing the elements of the local array in block 90. In some embodiments the set of references partitioned are references that access a portion of the array. The following pseudo-code example illustrates this embodiment.

```
float A[256] [256] ;
doall (l=128*j+16*P; l <= min(-i+254,128*j+16*P+15); l++)
  doall (m = 16*k; m <= min(-i+254, 16*k+15); m++)
    A[1+i+m] [1+i+l] -= A[1-i+m] [i] * A[i] [1+i+l];
```

In this case, all three references to array A are disjoint in that they access disjoint portions of the array. In this case, they are transformed into three local arrays A_2, A_3 and A_4 in the following manner.

```
float A_2[16] [16]; // a triangular subregion of A
float A_3 [ 16]; // a column of A
float A3 [16]; //a row of A
doall (l = 0; l <=min(15, -i-128*j-16*P+254); l++)
  doall (m = 0; m <= min(-i-16*k+254, 15); m++)
    A_2[m] [l] -= A_3[m] * A_4[l];
```

Performing transformations of the way data are allocated in memory, i.e., transforming the data layouts, has a combinational aspect, since the data sets accessed through each array reference may overlap with one or more data sets accessed by other array references. Since each one of those overlaps entail constraints in the way that data layouts can be transformed, analyzing all the combinations of overlaps for all the references is a source of high computational complexity. Hence, references are grouped into sets in such a way that data accessed through one set of references does not overlap data accessed through another set of references. In this embodiment, references of the same set are called "compatible references". Since there is no overlap among sets of compatible references, the following parts of the memory layout transformation, which consider the overlaps, can be applied independently to each set of compatible references. In particular, they will decide if the overlapping data sets accessed by a set of compatible references should be partitioned further and how.

In some embodiments, compatible references are identified by overlapping memory footprints during the execution of a particular subset of loop iterations. In an exemplary embodiment, the provided method identifies array references having overlapping memory footprints; duplicates a portion of the identified references; and associates each of the duplicates with disjoint subsets of the memory footprint. An example pseudo-code illustrates this embodiment.

```
double A[ 100] [100];
for (j = 0; j<100; j++) {
    . . . = A[i] [j] * A[j] [i];
}
```

The two references A[i] [j] and A[j] [i] overlap when i=j. However, if the references are allocated together, it is impossible to reduce the local memory usage using only affine transformations. This is because the data footprint of the two references is a 2-dimensional set (a cross), while the data footprints of the individual references are both 1-dimensional. In order to compute better allocations in situations like this, one embodiment first estimates how much overlapping is in the references. If the references are read-only, and if the overlapping data set is a small percentage of the overall data set, the embodiment splits the references into two distinct references to one-dimensional data sets. In the above example, the embodiment will generate the following local memory allocation. Note that the center element of the data foot print, A[i][i], has been replicated and put into the locations A_1 [i] and A_2 [i].

```
double A_1[100];
double A_2[100];
Transfer A[i] [j] to A_1[i], i = 0 . . . 99
Transfer A[j] [i] to A_2[i], i = 0 . . . 99
For (j 0; j < 100; j++)
    . . . A_1[j] * A_2[j];
```

The geometric re-arrangements provided by a further exemplary embodiment are defined by a piecewise affine transformation. In other words, the transformation applied to the references is defined as a set of functions, each element of the set being valid within a polyhedral domain of the loop values, the parameters and the coordinates of the data accessed through the set of compatible references. In an exemplary embodiment, when some of the data accessed by a set of compatible references are written by some of the references, the written data subset and a subset of the data set that is only read define a partition for the piecewise affine transformation. Consider the program represented by the following pseudo-code:

```
double A[100][100];
for (j = 0; j < 99; j++) {
    A[i] [j+1] =. . . A[j] [i];
}
```

In this example, the data set accessed by the both references to array A form a two-dimensional set, while the data sets accessed through each reference are one-dimensional. The data accessed through both references overlap in A[i][i]. In the exemplary embodiment, a piecewise transformation of A is applied, which separates A into two subsets, one for each one-dimensional data set, and marks one of them as receiving the updates (let us call it the "writing reference") to the duplicated data. In the example, the duplicated data is A[i][i] and the iteration domain is partitioned into three polyhedral domains, {0≤j<i}, {j=i} and {i<j<99}, in order to take into account the fact that only one of the data subsets is updated. Such a partition of the iteration domain is obtained by defining the iterations accessing duplicate data through "non-writing" references and replacing those accesses with an access through the writing reference. The resulting piecewise affine transformation is {(A[i][j−1]=A_1 [j], A[j][i]=A_2[j]) for 0≤i<100, 0≤j<i or i<j<100; and (A[i][j−1]=A_1 [j], A[j][i]=A_1 [j]) for 0≤i<100, i=j}. The result of the piecewise affine transformation can be represented by the following pseudo-code, which uses only two arrays as a replacement for the original array A, has quasi-optimal memory requirements (198 memory cells, while the optimal would be 197):

```
double A_1[99], A_2[99]
for (int j=0; j<i; j++) {
    A_1[j] = . . . A_2[j];
}
A_1 [i] = . . . A_1 [i−1 ]; // the updated value of A[j][i] is in A_1 [j]
when j=i
for (int j=i+1 ; j< 99; j++) {
    A_1[j] = . . . A_2[j];
}
```

In other exemplary embodiments, the geometric rearrangement is a piecewise affine transformation that defines a partition of the iteration domain and of the data sets in such a way that the number of references to a local array varies from one element of the partition to another. In the following example, in which the possible values of variable i are {0≤i≤99900}, the data sets accessed through reference A[j] and A[i+j] overlap when i is less than 100. Otherwise, they do not overlap.

```
double A [10000];
for (j =0; j< 100; j++) {
    A[i] = . . . * A[i+j]
}
```

Since those data sets overlap for some values of i, both references are put in the same group of compatible references. If the accessed data sets are allocated as a single local array, the amount of memory necessary to contain the array is 10000 memory cells. On the other hand, if they are allocated as two separate arrays, some of the data would have to be duplicated and the iteration domain (the j loop here) would have to be partitioned as in the previous exemplary embodiment. The amount of overlap when i is less than 100 may not be small enough and it may not be profitable to perform the duplication. The geometric rearrangement provided by the embodiment is a piecewise affine transformation that defines a partition of the set of parameters (in the current example, i): {(A_1 [j]=A[j]) for 0≤i<100, and (A_1 [j]=A[j], A_2[j]=A[i+j]) for i≥100}. The maximum amount of memory that has to be allocated for any value of i is 200 memory cells (as compared to 10000), and it is 100+i when i is less than 100. The resulting transformation can be represented as pseudo-code as follows:

```
if (i <100) {
    double A_1 [100+i];
    for (j=0; j< 100; j++) {
        A_1[j] = . . . * A_1[i+j]
    }
else {
```

```
                double A__1 [100];
                double A__2[100];
                for (j=0; j<100; j++) {
                    A__1[j] = . . .*A__2[j];
                }
            }
        }
```

One advantage of the geometric rearrangement that is performed by this exemplary embodiment is that the j loops are not partitioned. Partitioning the loops into smaller loops is often a factor of performance degradation, which is avoided in this exemplary embodiment. The partition of i is obtained by computing the domain in which both data sets intersect, by projecting the intersection onto the vector space of the parameters (in the current example, the parameter is i and the projected domain is {i<100}.

Figure 4:
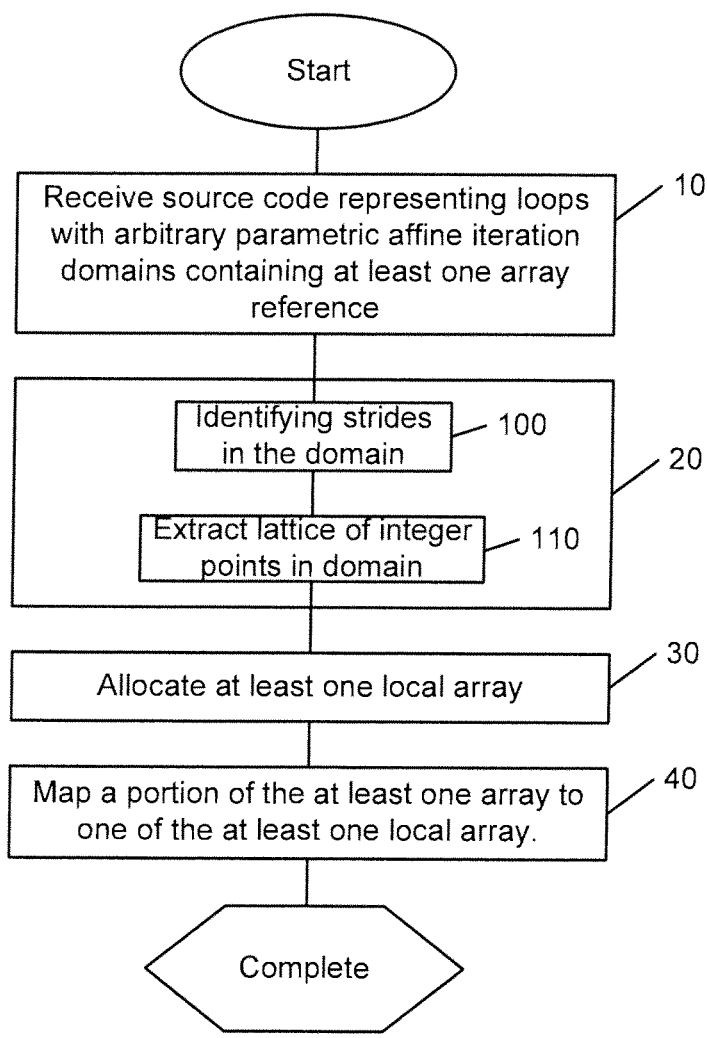
FIG. 4 illustrates the operational flow of an additional local memory compaction module in which inefficiencies in memory usage are determined using lattices of integer points.

The operation flow of a further provided embodiment of a local memory compaction module is illustrated in FIG. 4. In this embodiment, flow begins at block 10 where source code is received in memory. Similar to the above embodiment, the source code represents loops with arbitrary parametric affine iteration domains and contain at least one array reference. Flow continues to block 20 where inefficiencies in memory usage in the at least one array are identified. In this embodiment, the identification of inefficiencies includes block 100 where strides in the polyhedral domain that defines the accessed dataset are identified, and block 110 where a lattice of integer points within the domain is extracted from the domain. These integer points indicate that only a regular subset of the accessed data region is accessed. In this manner, more efficient allocation of local arrays is accomplished because portions of the array that are not accessed are identified and excluded from the mapping from the array to the local array.

Figure 5:
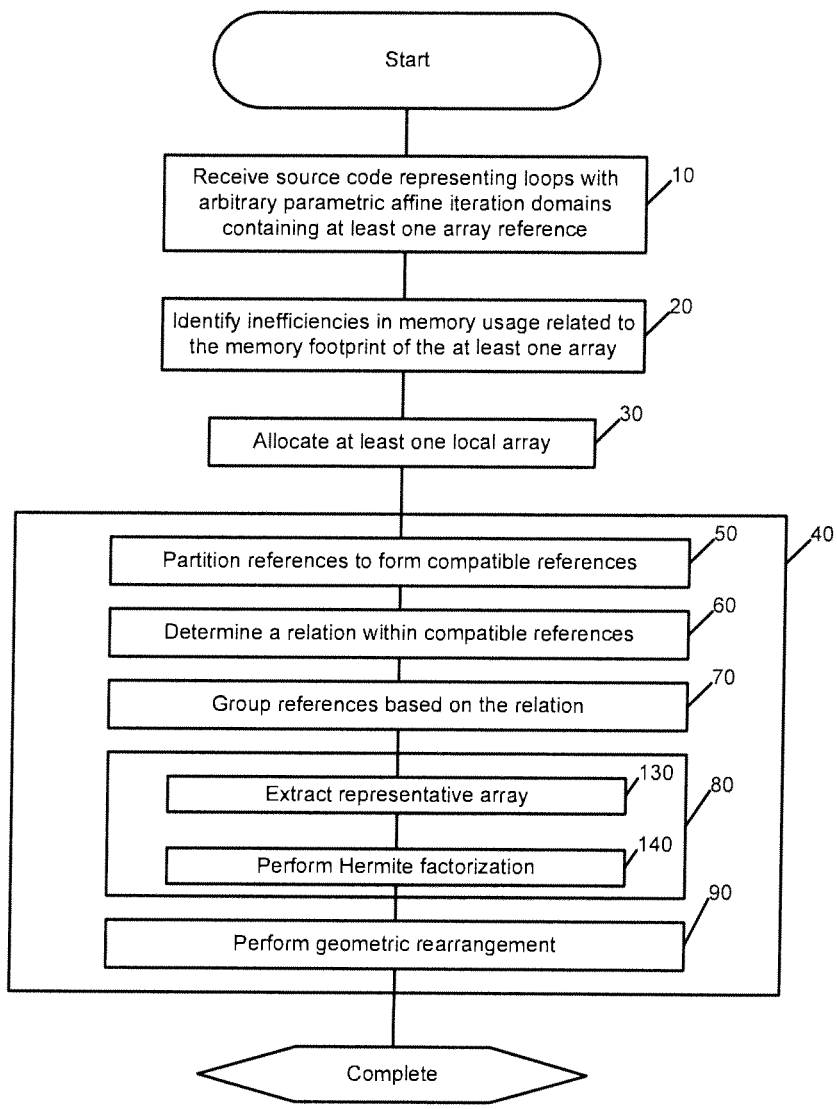
FIG. 5 illustrates the operational flow of an additional local memory compaction module for reducing the inefficiencies in local memory usage by extracting representative array references and producing re-indexing functions using Hermite factorizations.

An additional provided embodiment is illustrated in FIG. 5. In this embodiment, like earlier embodiments flow begins at block 10 where source code is received in memory. Similar to the above embodiment, the source code represents loops with arbitrary parametric affine iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, like in the embodiment illustrated by FIG. 3, mapping block 40 includes partitioning references to form compatible references in block 50; determining a relation within compatible references in block 60; grouping compatible references based on the relation in block 70; performing algebraic simplification in block 80; and performing geometric arrangement in block 90. The algebraic simplification block 80 includes block 130 where a representative array reference is extracted from a set of references accessing a portion of the array. In some embodiments, the representative array reference represents a set of references which access polyhedral datasets whose accessed points all lie on a lattice of integer points that is not the standard lattice, on which any integer point lies. These embodiments take advantage of the fact that array references represent affine functions, which can be represented as matrices called "access matrices". In the exemplary embodiment, the flow within block 40 goes from block 130 to block 140 where a Hermite factorization is performed for the access matrix representing the representative array reference. The Hermite factorization produces a piecewise affine index function.

One purpose of Hermite factorization is to reduce the dimension of the reference to the actual geometric dimension of the data footprint. In addition, if the access pattern contains strides, i.e., regular intervals between accessed data, using the non-unimodular matrix that results from the Hermite factorization in the transformation removes these strides in the resulting local references. For example, given an affine access function f(x, y) on loop indices x and parameters y, we first decompose it into the sum of g(x)+h(y), where g(x) is a linear function on x and h(y) is an affine function on y. This decomposition is an algebraic simplification that makes it possible to perform further computations on the part of f(x,y) that involves variables only. Function g(x) can be decomposed into g(x)=HU, where H=[H' 0] is the Hermite Normal Form of g(x) and U is unimodular matrix. Let $$U = \begin{bmatrix} U_1 \\ U_2 \end{bmatrix}$$

where HU=H'U$_1$. The following mapping from global to local indices is then performed f(x, y)f→U$_1$x.

Hermite factorizations have many uses is lattice computations. The Hermite factorization of a matrix G, written G=HU, writes matrix G as the product of two matrices, H and U. H, called the "Hermite normal form", is a canonical representation of the lattice (also) represented by G. U is a unimodular matrix, which entails that U, when used as a transformation, always transforms any point that has integer coordinates into another point that has integer coordinates. Also, any point that has integer coordinates can be obtained by transforming a point with integer coordinates using a unimodular transformation. This is important since most programming language conventions enforce that data elements, and particularly array elements, must have integer coordinates.

Figure 6:
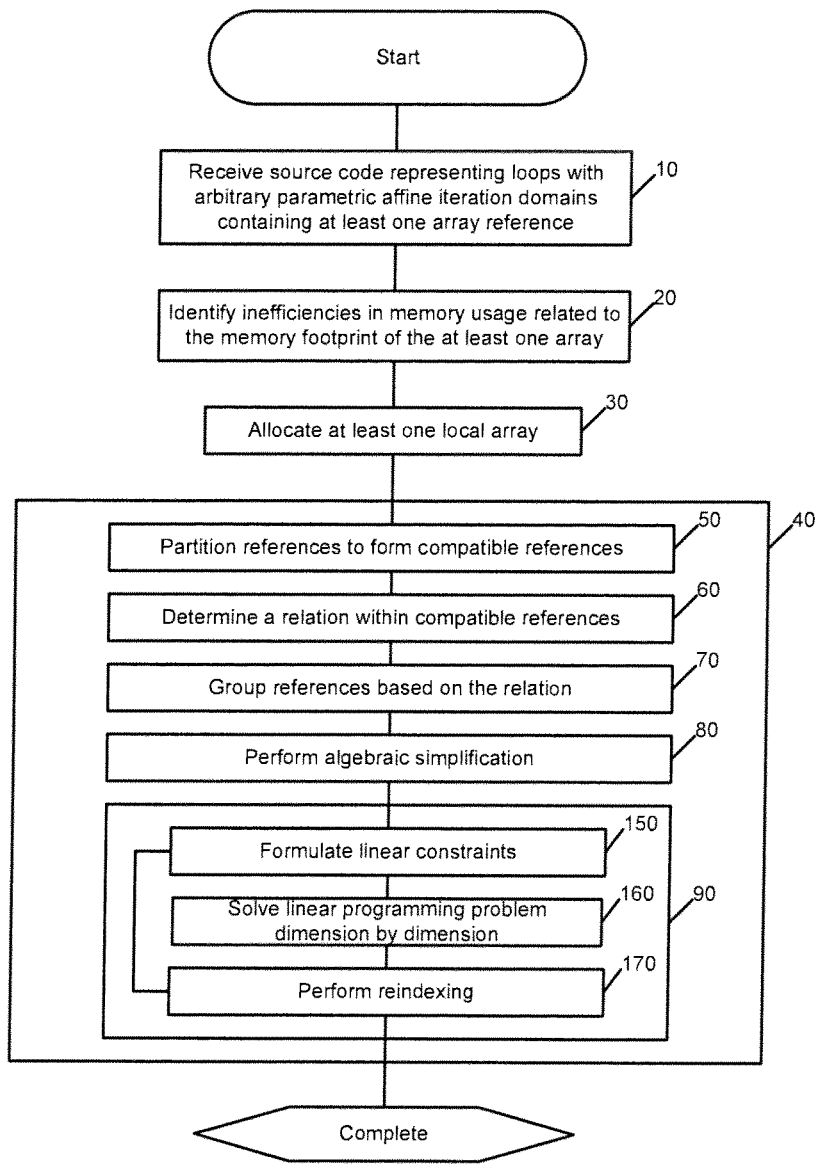
FIG. 6 illustrates the operational flow of an additional local memory compaction module for computing data re-indexing functions by producing linear constraints and solving a series of linear programming problems.

The flow of a still further provided embodiment is illustrated in FIG. 6. In this embodiment, like previous embodiments, flow begins at block 10 where source code is received in memory. Similar to the above embodiment, the source code represents loops with arbitrary parametric affine iteration domain and contain at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, mapping block 40 includes partitioning references to form compatible references in block 50; determining a relation within compatible references in block 60; grouping compatible references based on the relation in block 70; performing algebraic simplification in block 80; and performing geometric arrangement in block 90. Geometric rearrangement 90 contains blocks 150 where linear constraints are formed, block 160 where sets of linear programming problems are formed from the linear constraints and solved, and block 170 where a data reindexing is computed. In some embodiments, the flow goes back to block 150. In such embodiments, geometric rearrangements are applied iteratively until no reindexing function is found that reduces memory requirements.

Most modern programming languages abide by the convention that multidimensional arrays are allocated in memory as if they were canonical rectangular parallelotopes. In a space of d dimensions, a parallelotope is a finite polyhedron defined by 2d faces, and whose faces are pairwise parallel. A canonical rectangular parallelotope is a parallelotope for which the normal vectors to its faces are either a canonical vector or the negation of a canonical vector. Examples of rectangular parallelotopes are a cube (in a 3-dimensional space) and a rectangle (in a 2-dimensional space). In an exemplary embodiment, the transformation is a unimodular reindexing of the accessed data that minimizes the size of the smallest canonical rectangular parallelotope that encloses the accessed dataset. The smaller the enclosing rectangular parallelotope, the smaller the amount of memory that has to be allocated for the dataset.

In some embodiments, this is accomplished by formulating a first set of linear constraints through the use of Farkas Lemma. This first set of linear programming constraints is decomposed dimension by dimension to form a set of integer linear programming problems. This set of problems is then solved to provide the data reindexing function which can then be applied to the at least one local array. Unimodular reindexings transform integer points into integer points. Hence, the convention that data elements have integer coordinates is preserved by such a reindexing. In the case of affine transformations, the linear part of the transformation can be represented by a unimodular matrix.

Farkas lemma is a basic linear algebra theorem which is often used to obtain, from a set of affine constraints (i.e., inequalities and equalities) on variables with unknown coefficients, constraints that apply to the unknown coefficient themselves. In this embodiment, it is used to obtain a set of constraints involving the coefficients of the unimodular data reindexing function (which is represented as a matrix) and the width of the enclosing rectangular parallelotope along each dimension. From those obtained constraints, the method embodiment finds values of the coefficients of the unimodular data reindexing function for which the width is minimal, using integer linear programming. For example, the data set accessed through reference B[i+j][j] in the following pseudo-code can be reindexed so as to occupy only 100 memory cells:

```
Double A[n+10][n+10];
Double B[[2n+20][n+10];
For (i=n; i<n+10; i++) {
    For (j=n; j<n+10; j++) {
        A[i][j] = . . .B[i+j][i];
    }
}
```

The coordinates $(x_1, x_2)$ of the elements of array B accessed by that loop node are defined by the constraints $D: \{n \le x_2 < n+10;\ n \le x_1\ n+10\}$. The embodiment finds values of the coefficient of a matrix U such that U is unimodular and the coordinates x'-i and x'2 of the reindexed data are defined by:

$$\begin{bmatrix} x'_1 \\ x'_2 \end{bmatrix} = U \begin{bmatrix} x_1 \\ x_2 \end{bmatrix} + \begin{bmatrix} t_1 \\ t_2 \end{bmatrix} n + \begin{bmatrix} t_{01} \\ t_{01} \end{bmatrix}$$

The set of possible values of the coefficients of U, as well as the possible values of t1, t2, $t_{01}$ and $t_{02}$ are defined from the set of constraints D and the constraints that the data $(x'_1, x'_2)$ are enclosed in a rectangular parallelotope of size $(s_1, s_2)$ using Farkas lemma. Then, a value for those coefficients is computed for which the size of the smallest enclosing rectangular parallelotope ($s_1$, $s_2$ in our example) is minimal. Those values are computed by solving, dimension by dimension of the data set, an integer linear programming problem.

An integer linear programming problem defines a linear function of a set of variables, called the "objective function" and whose minimal (or, alternatively, maximal) value over a polyhedral domain called the "feasible set", is looked for. Solvers for such problems typically return a polyhedral domain, within the feasible set, for which the value of the objective function is minimal. In the running example, the embodiment finds:

$$\begin{bmatrix} x'_1 \\ x'_2 \end{bmatrix} = \begin{bmatrix} 1 & -1 \\ 0 & 1 \end{bmatrix}\begin{bmatrix} x_1 \\ x_2 \end{bmatrix} + \begin{bmatrix} -1 \\ -1 \end{bmatrix} n + \begin{bmatrix} 0 \\ 0 \end{bmatrix}$$

The following pseudo-code represents the program resulting from the data reindexing of array B in our running example:

```
Double A[10][10];
Double B[[2n+20][n+10];
For (i=n; i<n+10; i++) {
    For (j=n; j<n+10; j++) {
        A[i][j] = . . .B[j-n][i-n];
    }
}
```

The data footprint of the re-indexed array B is now reduced to 100 memory cells, instead of $n^2+20n+100$ initially.

In one of the exemplary embodiments, the unimodular nature of the reindexing matrix U is obtained by forcing U to be triangular and forcing the absolute value of the diagonal elements to be one. In another embodiment, the unimodular nature of the reindexing matrix is obtained by composition of an upper triangular unimodular and a lower triangular unimodular matrix. The advantage of that other embodiment is that the class of unimodular reindexing functions produced is not limited to the reindexing functions represented by a triangular matrix. Finding those two matrices is equivalent to reindexing data twice, first by finding an upper triangular reindexing matrix as described above and applying the reindexing, and then by finding a lower triangular reindexing matrix for the reindexed set and by applying that second reindexing. Yet another embodiment produces, in the same way, a unimodular reindexing by composition of an upper triangular unimodular matrix, a permutation matrix and a lower triangular unimodular matrix. The advantage of the embodiment is that the class of reindexing function that can be produced is the whole class of integer unimodular matrices.

Figure 7:
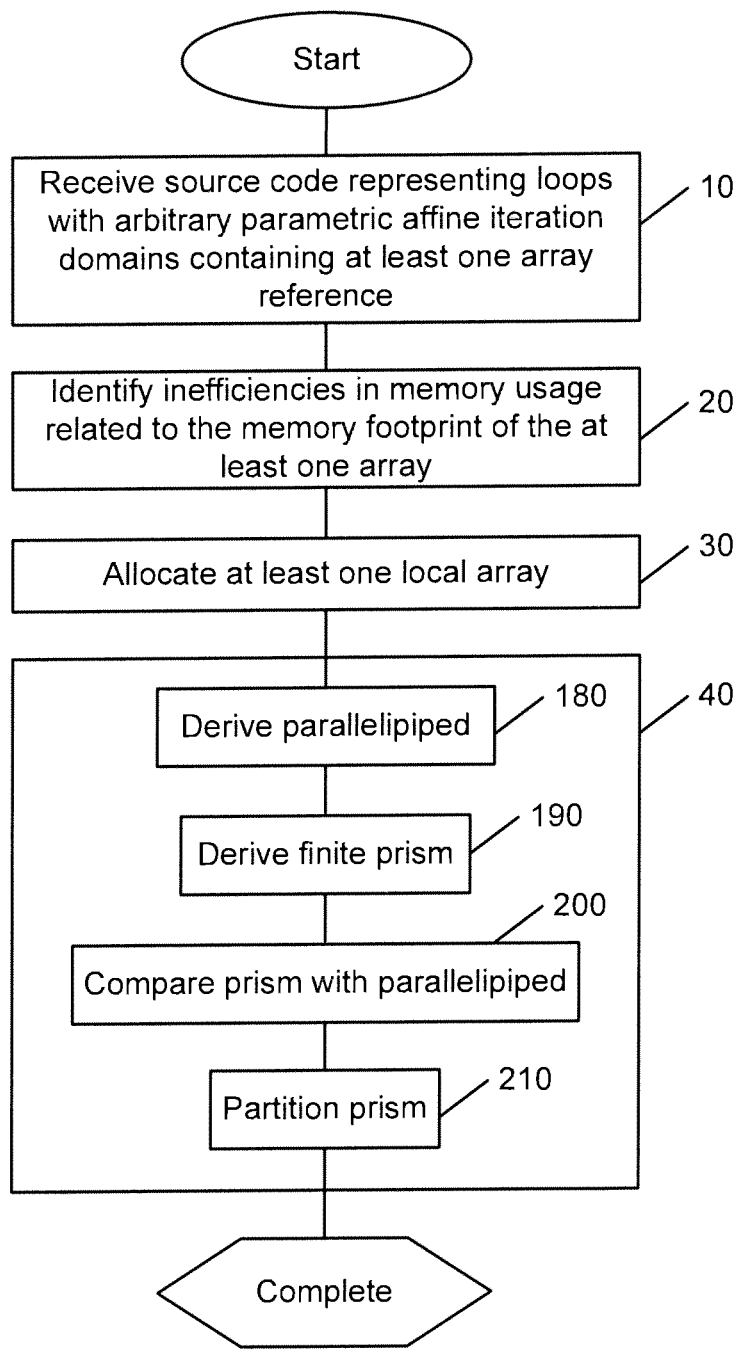
FIG. 7 illustrates the operational flow of an additional local memory compaction module for computing data re-indexing functions by finding a prism of triangular base that encloses the accessed data set and reducing the memory requirements of the enclosed data region by transforming the data elements that lie within a subset of the prism of triangular base.

Turning to FIG. 7 which illustrates another embodiment of a provided method, like the previous embodiments, flow begins in block 10 where source code is received in memory. Similar to the above embodiment, the source code represents loops with arbitrary parametric affine iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this illustration, block 40 contains block 180 where a parallelotope of minimal volume is derived this parallelotope enclosing the domain of the data set accessed by the local arrays. Block 40 additionally contains block 190 where a finite prism of triangular base is derived.

As used herein, a finite prism is a polyhedron defined by a set of translations of a "base" polyhedron, which lies in a subspace of the considered space, by a finite convex set of linear combinations of vectors of the complementary subspace. Since they are finite, it is possible to characterize the maximum extent of a finite prism along the directions of the complementary subspace. In this document, those extents are called "height" of the prism (there is one height along every direction of the complementary subspace). A triangular prism is a prism whose base polyhedron is a triangle. In two dimensions, it is just a triangle. In one embodiment, this finite prism has a minimum volume that encloses the data footprint domain. In block 200 the prism is compared to the parallelotope. In block 210 the prism is partitioned into two prisms. One of the two is then transformed using a central symmetry such that the union of the transformed prism and the non-transformed prism has a smaller memory footprint than the enclosing parallelotope. One advantage of that embodiment is that it provides data layouts that have smaller memory requirements, for a class of accessed datasets for which methods based on parallelotopes are not optimal.

For instance, the dataset accessed by the program represented by the following pseudo-code through reference B is triangular:

```
For (i=0; i< 10; i++) {
    For (j=0; j< i; j++) {
        ... = ... B[i][j];
    }
}
```

The embodiment finds three constraints that enclose the accessed data set, in a similar way as in the embodiment depicted in FIG. 6, using the Farkas lemma. The minimal volume for a parallelotope that encloses the dataset would be about twice the volume of the triangle. Hence, using such a parallelotope to determine the memory allocation of the dataset is bound to be sub-optimal. Instead, the current embodiment, depicted in FIG. 7, defines a tighter enclosing polyhedron using three inequalities (it is then a prism of triangular base). Using the enclosing prism, the data set is partitioned in two subsets, say A and B, and subset A is re-indexed in such a way that both the array elements in B and the re-indexed elements are enclosed in a smaller parallelotope than the original parallelotope. The volume of the new parallelotope is about the volume of the prism of triangular base. Since there is a parallelotope of smaller volume enclosing the reindexed data set, its memory requirements are smaller. The result is a piecewise affine array reindexing, which typically partitions the loop iterations into the iterations that access A, and the ones that access B.

In the current embodiment, the three inequalities {(a): aI+a$_0$≥0; (b):bI+b$_0$≥0; (c): cI+c0≥0} that define the triangular prism P, where I is the vector of data coordinates are used to devise the partitioning. Let x$_w$ a point in the intersection of (b) and (c) and let w=ax$_w$I+a$_0$. The prism is partitioned into A and B as follows:

$$A = P \cap \left\{ aI + a0 - \frac{w+1}{2} \geq 0 \right\}$$

and B=P−A. A point, x$_0$, is defined that is in the domain {aI+a$_0$−w+1<0; bI+b$_0$<0} whose coordinates are a multiple of ½ and whose "height" in the prism is about half of the height of the prism. Array elements that are defined by A are transformed using a central symmetry of center x$_0$. In the program represented by the following pseudo-code, the tightest enclosing parallelotope, defined by {0≤x1≤9; 0≤x2≤9}, where x1 represents the first dimension of array C and x2 its second dimension, includes 100 array elements.

```
Double C[10][10];
For (i=0; i< 10; i++) {
    For j=0; j< i; j++) {
        ...C[i][j]...;
    }
}
```

The tightest enclosing triangle, defined by {0≤x1; 0≤x2; x1+x2≤9}, by comparison, includes 55 elements, which is about half the number of elements required for the enclosing parallelotope. Since the number of array elements in the enclosing triangle is less than the number of array elements in the enclosing parallelotope, the embodiment considers the tightest enclosing triangle and partitions the enclosed data into data subsets A: {0≤x$_1$; 5≤x$_2$; ≤9} and B: {0≤x$_1$; 0≤x$_2$≤4; x$_1$+x$_2$≤9}. Point $$x_0 = \left(5, \frac{9}{2}\right)$$

is selected as center of symmetry and the elements of A are then transformed into a new array subset A' as follows:

$$\left\{ x'_1 = (2*5) - x_1; x'_2 = \left(2*\frac{9}{2}\right) - x_2 \right\},$$

where (x'$_1$,x'$_2$) are the new array element coordinates. The resulting program can be represented by the following code:

```
Double C[11][5];
For (i=0; i< 10; i++) {
    For (j=0; j<=4 &&j<i; j++) {
        ...C[i][j]...;
    }
    For (j=5; j<i; j++) {
        ...C[10−i][9−*j]...;
    }
}
```

The accessed data set is included in the parallelotope {0≤x1<11, 0≤x2<5}, whose memory requirements are of 55 memory cells, i.e., about half of the parallelotope before the transformation. Other data layout optimizations, which are optimal when there is a tight parallelotope enclosing the accessed dataset, will then be more optimal than if applied straightforwardly to the original dataset that can be enclosed more tightly with a triangular prism.

Figure 8:
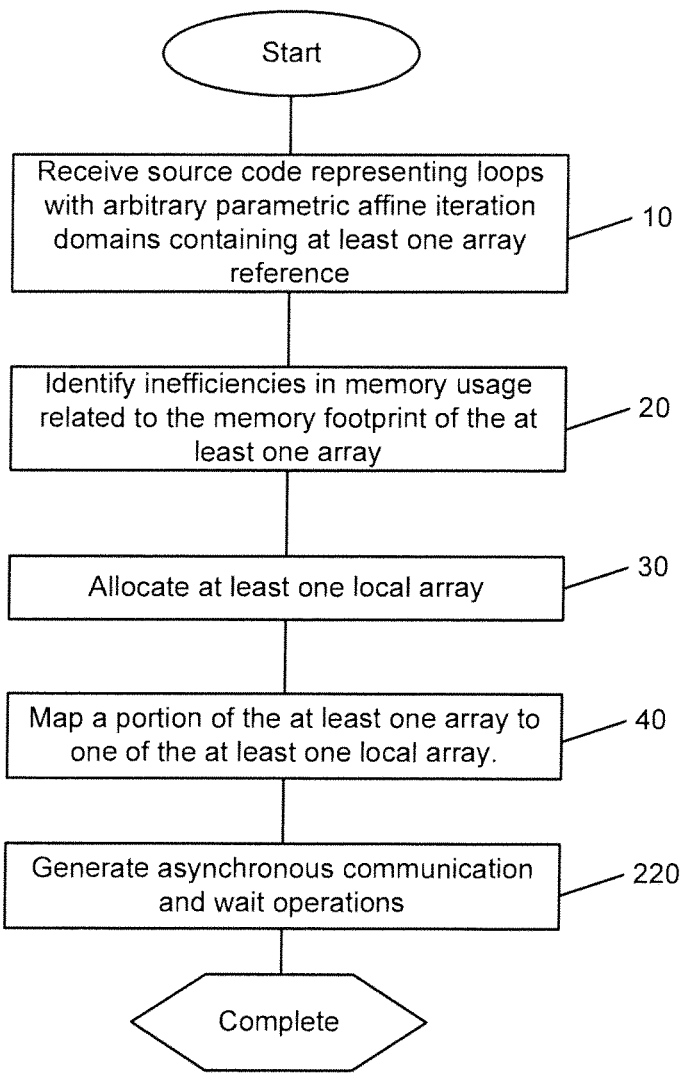
FIG. 8 illustrates the operational flow of an additional local memory compaction module using data re-indexing information to produce abstract communication commands and schedule computations and communications for the program in such a way that their executions overlap.

FIG. 8 illustrates a further embodiment of a provided method. In this embodiment, flow begins in block 10 where source code is received in memory. Similar to the above embodiment, the source code contains loops with arbitrary parametric affine iteration domain and contain at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. Flow then continues to block 220 where asynchronous communications and wait operations are generated. The exemplary embodiment uses the mapping between local memory elements and the elements of the original arrays, in conjunction with a description of the data that are needed as input and produced as output of the tasks to be executed, to produce an abstract representation of the transfers between the original arrays and the local memory elements. In an exemplary embodiment, the generation of these communications and wait operations includes the use of multi-buffering for overlapping communication and computation operations.

Many computers that contain processors that have an explicitly managed local memory also have the ability to transfer data at the same time as they are performing other computations. Such transfers are called "asynchronous". The main reason for using that feature is that the typical time necessary for such transfers is often comparable to the time taken to perform computations between two consecutive transfers of input data. Since doing both transfer and computation at the same time takes less time than doing one after another, the effect of overlapping them is to improve the overall program execution time. The use of several memory zones, specialized to either execution, reception or sending of data, makes the overlap possible. Such a use is called "multi-buffering". The specialization of the buffers is also modified at certain times. Such a modification is called a "rotation of the buffers", since a buffer is cyclically assigned the same specialization.

One embodiment computes a local memory mapping, adds a polyhedral representation of the communications and schedules communications and computations in a multi-buffering scheme for the program represented by the following pseudo-code. In this pseudo-code, every iteration of the k loop works on a distinct instance of local memory:

```
for (k = 0; k <= 7; k++) {
    for (l = 0; l<= 15; l++) {
        for (m = 0; m <= 15; m++) {
            for (n = 16 * k; n <= 16 * k + 15; n++) {
                C[l][m] = C[l][m] + A[l][n] * B[n][m];
            }
        }
    }
}
```

This results in a program that can be represented by the following pseudo-code:

```
for(k = -1; k<= 8; k++) {
    if (k <= 7 && k >= 0) {
        wait(tag=0);
        rotate(vars=[C_l, A_l, B_l]);
    }
    if (k <= 6) {
        for (l = 0; l <= 15; l++) {
            for (m = 0; m <= 15; m++) {
                get(src=&B[l][16 + 16 * k + m], dst=&B_l<1>[l][m], tag=0);
            }
        }
        for (l = 0; l <= 15; l++) {
            for (m = 0; m <= 15; m++) {
                get(source=&A[l][m], destination=&A_l<1>[l][m], tag=0);
            }
        }
    }
    for (l = 0; l <= 15; l++) {
        for (m = 0; m <= 15; m++) {
            get(src=&C[l][16 + 16 * k + m, tag=0);
        }
    }
}
if (k >= 1) wait(tag=1);
if (k <= 7 && k >= 0) {
    for (l = 0; l <= 15; l++) {
        for (m = 16 * k; m <= 16 * k + 15; m++) {
            for (n = 0; n <= 15; n++) {
                C_l[l][-16 * k + m] = C_l[l][-16 * k + m] +
                    B_l[n][-16 * k + m] * A_l[l][n];
            }
        }
    }
    for (l = 0; l <= 15; l++) {
        for (m = 0; m <= 15; m++) {
            put(src=&C_l[l][m], dst=&C[l][16 * k + m], tag=1);
        }
    }
}
```

In the code example, "Get" operations are transfers from an original array to a reindexed array in local memory. "Put" operations are transfers from local memory to original array. While the values of k in the original program were going from 0 to 7, in the multi-buffered version produced by the embodiment they are going from −1 to 8. At iteration k=−1, the first "get" transfers are issued. At iteration k=8, the last "put" transfers are issued. "Wait" operations, which wait for the completion of a series of transfers, were also inserted to ensure that a transferred data set is completed at that point of the program's execution. In the embodiment, a tag system is used to identify the transfers whose completion is to be waited upon. The "rotate" operations operate the buffer rotation.

Automatic Generation of Data Transfer

An additional feature of various embodiments is that they provide for automatic generation of communication operations (e.g., asynchronous DMA) to transfer data between two memories (e.g., local and global memories). Some provided embodiments can convert communication commands, which have the semantics of an element-per-element copy, into strided DMA commands, which can copy (strided) blocks of data in an efficient manner and thus actually exploit the bulk communication capabilities/requirements of the target machine. The algorithm typically works by aggregating one-dimensional, polyhedral sets of data into packets, and produces a loop that scans these packets. The algorithm then generates a data transfer operation, e.g., a DMA command (with its parameters) that will execute the packet transfer. These operation parameters (e.g., DMA command parameters) are usually the base address, the stride, the element size and the number of elements to communicate, for both the sender and the receiver sides. Further embodiments provide methods for generalization to different data transfer capabilities and restrictions by a number of methods including two sided (e.g., remote and host) strides, strides in more than one dimension, and accounting for alignment constraints and memory bank constraints. In some instances, it is desirable to enlarge the transfer set so that it becomes rectangular, rather than of a complex, of a non-convex shape. This is similar but not the same as what is provided in local memory compaction's unimodular reindexing described above. Further embodiments provide for merging multiple data transfer commands into a single command. For example, if two transfers happen to be from and to contiguous memory, or if one command transfers data from even addresses and another to odd addresses, the corresponding data transfer operations may be combined into a single data transfer operation.

In general, tasks that are mapped onto different processors communicate with each other and with a main host processor. When migrating data from one processor to another, we have a further opportunity to change the data layout to improve storage utilization and locality of references. For example, when inserting explicit communication into the following loop:

```
double A[300,300];
    for (i = 0; i < 100; i++) {
    A[2*i+100,3*i] ... ;
}
``` we can utilize a different layout the array A in local memory as shown below:

```
double A_local[100];
Transfer data from A[2*i+100,3*i] to A_local[i]
for (i = 0; i < 100; i++) {
    ... = ... A_local [i] ...;
}
```

As described above, transforming the reference from A [2*i+100, 3*i] to A_local[i] can reduce the storage requirements of local memory from 300×300 elements to 100 elements.

Thereafter, communication commands created in the mapping process may have to be physically realized as actual operations supported by the underlying architecture. In some embodiments, this is performed during data transfer operation generation/optimization phase of the mapper. On some architectures such as CELL and TRIPS, communication commands are mapped into operations to the DMA engines issued from the remote processors. On other architectures, such as some FPGA systems, they are turned into buffer management and DMA operations to be issued on a host processor.

Generating Bulk Communication

In various embodiments, one of the tasks of the local memory compaction phase is to insert communication code to transfer data between two memories, such as global and local memories. In order to ensure communication overhead is minimized, only bulk communication operations are generated as described with reference to FIG. 10, and these are inserted only at the boundaries of the innermost kernels, such that there is no communication operations within a kernel. During communication insertion an asynchronous communication model is assumed with the following primitives:

Asynchronous communication initialization operations such as put and get. These operations can initiate an asynchronous transfer of a region of data from one processor and/or memory to another. These generic operations can be expressed as:

get $A[f(x,y)]$ from $B[g(x,y)]$ for $x \in \mathcal{D}(y)$ tag $t$ put $A[g(x,y)]$ to $B[f(x,y)]$ for $x \in \mathcal{D}(y)$ tag $t$ where A is a local array, B is a global array, y are the system parameters, and (f, g, $\mathcal{D}$) together describe the set of elements to be transferred. The semantics of the get operation is identical to the following loop nests:

for $x \in \mathcal{D}(y)$ $A[f(x,y)]=B[g(x,y)]$ while the put is identical to the following:

for $x \in \mathcal{D}(y)$ $B[f(x,y)]=A[g(x,y)]$

A wait t operation which blocks the execution of a thread until a group of initiated communications have completed. Groups of communication operations are associated with a tag t.

It should be stressed that the above primitives are generic in nature, and do not necessarily correspond directly to actual target machine primitives. Mapping of these primitives into lower level DMA operations is described later. The following example illustrates how communication operations can be inserted by a mapper in one embodiment. Suppose the following matrix multiply is to be mapped onto a distributed memory machine that includes eight (8) distributed processor elements:

```
float A[1024][1024];
float B[1024][1024];
float C[1024][1024];
for (int i = 0; i <= 1023; i++) {
    for (int j = 0; j <= 1023; j++) {
        for (int k = 0; k <= 1023; k++) {
            C[i][j] = C [i][j] + A [i][k] * B [k][j];
        }
    }
}
```

After affine scheduling, tiling and processor placement, we can obtain the following single-program, multiple data (SPMD) loop nests, where the newly introduced parameter P ranges from 0 to 7 and stands for the current processor id.

```
float A[1024][1024];
float B[1024][1024];
float C[1024][1024];
for (int i = 0; i <= 31; i++) {
    for (int j = 128 * P; j <= 128 * P + 127; j++)
        for (int k = 32 * i; k <= 32 * i + 31; k++)
            c [j][k] = 0;
    for (int j = 0; j <= 15; j++)
        for (int k = 128 * P; k <= 128 * P + 127; k++)
            for (int l = 32 * i; l <= 32 * i + 31; l++)
                for (int m = 64 * j; m <= 64 * j + 63; m++)
                    C[k][l] = C [k][l] + A [k][m] * B [m][l];
}
```

The above loop nests operate on arrays A, B, and C, which are located in the memory of the host processor. In order to produce a distributed memory mapping, local memory compaction optimization is performed as described above and the following loop nests are produced. New local variables A_I, B_I and C_I are introduced and placed within the memories of the remote processor units:

```
local float A_l[128][64];
local float B_l[64][32];
local float C_l[128][32];
float A[1024][1024];
float B [1024][1024];
float C [1024][1024];
```

```
for (int i = 0; i <= 31; i++) {                                    // LOOP i
    for (int j = 128*P; j <= 128*P + 127; j++)
        for (int k = 32*i; k <= 32*i + 31; k++)
            C_I[j -128*P] [-32*i + k] = 0;
    put C_I[j][k] to C[j + 128*P][32*i + k],
        for 0 <= j <= 127, 0 <= k <= 31 tag 1;
    wait 1;
    for (int j = 0; j <= 15; j++) {
        // fetch submatrices from A, B and C
        get B_I[k][l] from B[64*j + k][32*i + l]                    // GET B
            for 0 <= k <= 63, 0 <= l <= 31 tag 0;
        get A_I[k][l] from A[k + 128*P][64*j + l]                   // GET A
            for 0 <= k <= 127, 0 <= l <= 63 tag 0;
        get C_I[k][l] from C[k + 128*P] [32*i + l]                  // GET C
            for 0 <= k <= 127, 0 <= l <= 31 tag 0;
        wait 0;
        // kernel
            for (int k = 128*P; k <= 128*P + 127; k++)
                for (int l = 32*i; l <= 32*i + 31; l++)
                    for (int m = 64*j; m <= 64*j + 63; m++)
                        C_I[k -128*P] [-32 * i + l] +=
                            B_I[-64*j + m] [-32*i + l] *
                            A_I[k -128*P] [-64*j + m];
        // write back a submatrix of C
        put C_I[k][l] to C[k + 128*P] [32*i + l]                    // PUT C
            for 0 <= k <= 127, 0 <= l <= 31 tag 1;
        wait 1;
    }
}
```

In the example above, all of the multiplications associated with multiplying the 1024×1024 matrix A with another 1024×1024 matrix B, i.e., a total of 1024×1024×1024 multiplications, are distributed to eight processors, each indexed by a unique value of P in the range 0 through 7. Each of the eight processors receives in one iteration subsets of matrices A and B from the host memory, computes a corresponding subset of the product matrix C, and transfers the computer subset to the host memory. In this embodiment, a local matrix A_I, that corresponds to the matrix A and that is stored in a local memory is a 128×64 matrix, and a local matrix B_I, corresponding to the matrix B and stored in the local memory is a 64×32 matrix. As such, the local product matrix C_I, corresponding to matrix C and stored in the local memory, is a 128×32 matrix. Thus, in each iteration each of the eight processors can compute a 128×32 subset of the product matrix C. As each of the eight processors can compute a different 128×32 subset of matrix C in one iteration, in a total of 32 iterations the eight processors can compute the entire 1024×1024 matrix. These 32 iterations are represented by LOOP i.

In each iteration of LOOP i, the statement identified by GET B and the subsequent "for" iterator retrieve a subset of the matrix B to the corresponding local memory B_I of each of the eight processors. Similarly, the statement identified by GET A and the corresponding "for" iterator retrieve a subset of the matrix A to the corresponding local memory A_I of each of the eight processors. Finally, the statement identified by GET C and the corresponding "for" iterator retrieve a subset of the matrix C, which is initialized to zero, to the corresponding local memory C_I of each of the eight processors. After the computation of the product of the retrieved subsets, as indicated by the statements labeled as kernel, the PUT C statement and the corresponding "for" iterator transfer the computed subset C_I from the local memories of the respective processors to the matrix C in the global memory.

With reference to the example above, x is a vector that represents values of loop iterators that scan element-wise transfers. They are the vector (k, l) in the example above. As described above, y is a vector of loop counters and other expressions whose value stay constant during the transfer. In the foregoing example, they are the vector (i, j). $\mathcal{D}$ is a set of constraints that define the values taken by x as a function of y. In some cases, x takes on values independently of y. $\mathcal{D}$ in the foregoing example includes the constraints: $0 \le k \le 63$, $0 \le l \le 31$; these constraints do not depend on y (i.e., (i, j)). The functions f and g define which data element of A and B participates in the transfer, for each value of i, j, k, and l.

It should be understood that the example above is only a representative of memory transfers. Memory transfers, in general, may be required according to various computations, such as factorization, decomposition, solutions of linear and non-linear equations, inverse, transpose, and/or conjugate computations, etc. Also, such operations may be performed not only on two-dimensional matrices, but on scalar data, arrays, multi-dimensional arrays or tensors, and other simple or complex data structures. In general, in performing a specified operation/computation on a given set of operands using two or more processors, it is necessary to transfer at least portions of one or more operands stored in a global or master memory to one or more memories. These memories may be distributed, and may be associated with the different processors to which at least parts of the computation are designated. A memory associated with a processor is often called a local memory. At least portions of partial and/or final results may also be transferred from one or more memories, e.g., local memories, to the master or global memory.

In the distributed matrix multiplication example above, the generic "get" and "put" operations represent transfer of individual data elements between two memories, e.g., a global memory and one or more local memories. In some computations, a transfer can occur between two local memories. The "for" iterators, together with the corresponding "get" and/or "put" operations represent a transfer of a set of data elements. As described above in connection with local memory compaction, such transfer can include a contiguous block of data elements and/or a set of data elements spaced in a certain deterministic manner, such as evenly spaced, evenly spaced, i.e., strided blocks of contiguous data elements, etc. As described below, in various embodiments a data transfer operation is configured such that a data required for at least a part of a computation and/or produced by at least a partial computation can be transferred from one memory to another. The data transfer operation so configured can transfer, without requiring explicit specification of any iterators, data that may be contiguous or spaced according to a deterministic pattern in one or both memories.

The data transfer operation optimization component of the mapper, such as a polyhedral mapper, can turn the generic communication operations into an optimized set of data transfer operations (e.g., DMA transfer commands) supported by the underlying target architecture. Recall that the generic communication commands may have the forms:

get $A[f(x,y)]$ from $B[g(x,y)]$ for $x \in \mathcal{D}$ (y)tag $t$ put $A[g(x,y)]$ to $B[f(x,y)]$ for $x \in \mathcal{D}$ (y)tag $t$ wait $t$ Here, get and put operations are issued to transfer an arbitrary region of memory from one memory to another. All operations are tagged with an integer tag, and can be blocked until completion when a wait operation with the corresponding tag is executed.

While a wide array of different data transfer architectures is available, the following list of characteristics typically hold for all of them:

- All data transfer operations can be asynchronously issued, i.e., the data transfer operations can be executed without delaying computation code, thus allowing communication and computation to overlap in time.
- Multiple data transfer operations may be issued in parallel, up to some limit.
- One-dimensional strided accesses are possible.
- While many data transfer engines impose size and alignment restrictions on the transfer parameters, the data structures allocated by the compiler and by the mapper generally can be made naturally aligned. Thus part of the alignment restrictions can be trivially satisfied at compile time.

Figure 10:
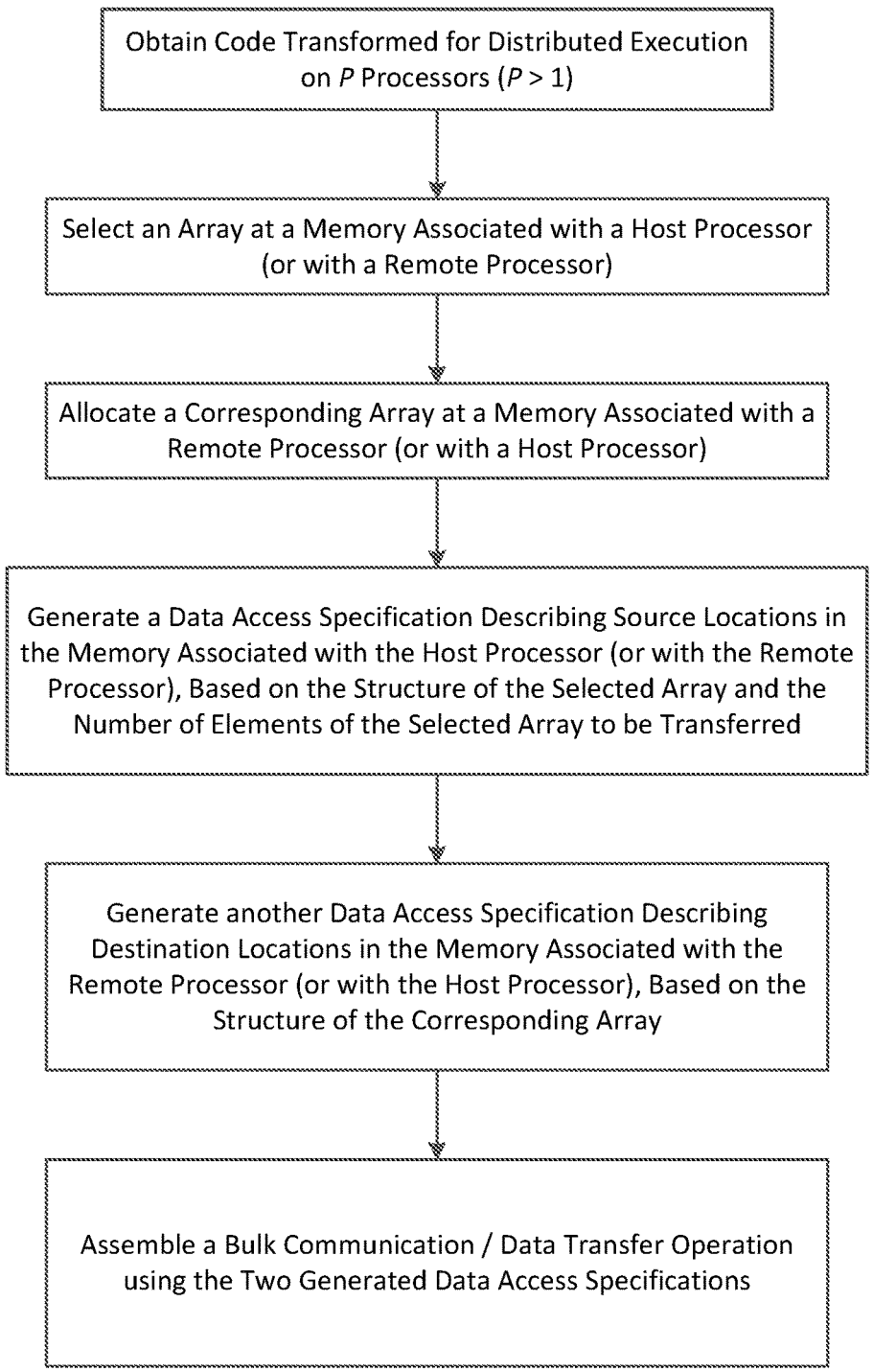
FIG. 10 illustrates the operational flow of a local memory compaction module using source and destination addresses to produce bulk communication/data transfer commands according to provided embodiments.

In some embodiments, the above data transfer operations are mapped, as shown in FIG. 10 into one or more of the following 1-D strided DMA primitives:

```
dma_get{src=s,dst=t,
        count=n,bytes=b,
        srcStride=ss,
        dstStride=ds,
        tag=tag}
dma_put{src=s,dst=t,
        count=n,bytes=b,
        srcStride=ss,
        dstStride=ds,
        tag=tag}
dma_wait{tag=tag}
``` where the semantics of dma_get in terms of pseudo code is:

```
dma_get{src=s,dst=t,
        count=n,bytes=b,
        srcStride=ss,
        dstStride=ds,
        tag=tag} =
for (i = 0; i < count; i++, s += ss, d += ds) {
    memcpy(d, s, b);
}
```

The semantics of dma_put can be stated similarly as that for dma_get.

Typically, in terms of execution cost of data transfer operations: (i) there is a substantial startup cost for each transfer operation, and (ii) there is a transfer cost for each byte in the message. The actual startup cost and transfer rate can be parameterized in the machine model of the target machine. However, given such constraints, the data transfer operation optimization problem can be formulated as: (A) Minimize the total number of data transfer commands issued; and/or (B) Minimize the total number of bytes transferred.

Example

Consider the following communication operations/commands embedded in a loop nest:

```
double A[128][128];
double B[128][128];
double A_l[16][16];
double B_l[16];
double C_l[16][16];
for (i = ...) {
```

```
    for (j = ...) {
        ...
        get A_l[k][l] from A[16 * P + k][16 * i + l]
            for 0 <= k <= 15, 0 <= l <= 15 tag 0;
        get B_l[k] from B[16 * j + k][16 * i + k]
            for 0 <= k <= 15 tag 0;
        get C_l[l][k] from C[16 * P + k][16 * i + l];
            for 0 <= k <= 15, 0 <= l <= 15 tag 0;
        wait 0;
        ...
    }
}
```

In each iteration of i and j, a rectangular 16×16 block of A is fetched into A_1, a diagonal segment of B is fetched into B_1, and another rectangular 16×16 block of C is fetched into C_1, but with its rows and columns permuted, i.e., a corner turn.

For these operations, one possible mapping, using DMA operations for data transfers, as shown in FIG. 10, is as follows:

```
for (i = ...) {
    for (j = ...) {
        ...
        dma_get{src=&A[16*P][16*i], dst=&A_l[0][0],
                count=16, bytes=16*sizeof(double),
                srcStride=128*sizeof(double),
                dstStride=16*sizeof(double), tag=0};
        dma_get{src=&B[16*j][16*i], dst=&B_l[0],
                count=16, bytes=sizeof(double),
                srcStride=128*sizeof(double),
                dstStride=sizeof(double), tag=0};
        for (l = 0; l < 15; l++) {
            dma_get{src=&C[16*P][16*i+l],
                    dst=&C_l[l][0],
                    count=16,
                    bytes=sizeof(double),
                    srcStride=128*sizeof(double),
                    dstStride=sizeof(double),
                    tag=0
            };
        }
        dma_wait{tag=0};
        ...
    }
}
```

The DMA mappings are generated as follows: For array A, a strided DMA command is used to transfer 16 row portions of A, with each block having 16 elements. The result is compacted into the array A_I. For array B, a strided DMA command can be used to transfer a diagonal segment of B into B_I. For example, a source stride of 128*sizeof (double) corresponds to the transfer of a column, i.e., the transfer of B[16j+k][16i]. A source stride of 129*sizeof (double) can transfer B[16j+k][16i+k], i.e., the diagonal elements of B. The strided DMA command transfers 16 blocks each of one element long. The source stride is staggered so that only the diagonal elements are transferred. For array C, 16 strided DMA operations are issued to transfer C_I. In this case, a single strided DMA operation is insufficient because it is a corner turn. Finally, the dma_wait command is issued to block subsequent operations until all DMA operations (data transfer operations, in general) have completed. In some embodiments, it is possible to overlap communication and computation by delaying the wait operation further.

In the example above, one data transfer operation corresponding to the first dma_get command would transfer 16 units of data, as specified by "count=16." Each unit would include 16 double-precision values, as specified by "bytes=16*sizeof(double)," and each unit will be strided by 128*sizeof(double), as specified by the parameter "src-Stride." Thus, a data transfer operation per the first dma_get command will transfer 256 double-precision values in a single iteration.

With respect to the second dma_get command, a single data transfer operation per that command would also transfer 16 units of data, as specified by "count=16." Each unit in this operation, however, would include only one double-precision value, as specified by "bytes=sizeof(double)," and each unit/chunk will be strided by 128*sizeof(double), as specified by the corresponding "srcStride." Thus, a data transfer operation per the second dma_get command will transfer 16 double-precision values in a single iteration.

With respect to the first dma_get command, which transfers data from the matrix A to matrix A_I, the data transfer size corresponding to one data transfer operation of that dma_get command is 256*sizeof(double), which is no greater than the size of the matrix A_I. In this case, the data transfer size corresponding to one data transfer operation is actually the same as the size of A_I, so only one iteration of this data transfer operation is required.

The parameter "count" can be changed to a different value, e.g., 8, and accordingly, the data transfer size corresponding to one data transfer operation of the first dma_get command as modified would be 128*sizeof(double), which is less than the size of the matrix A_I. In this case, two iterations of the data transfer operation would be required. In the exemplary dma_get and dma_put commands, the parameters "count" and "bytes" together determine the data transfer size corresponding to one data transfer operation. The values of either or both of these parameters can be determined according to various processor parameters (e.g. word-length), memory parameters, and the parameters of communication links therebetween. In general, the data transfer size corresponding to one data transfer operation can be selected based on one or more of these system parameters, directly or via one or more parameters of the transfer operation/command.

Optimization of Data Transfer Operations

In some embodiments, the DMA optimization algorithm in the mapper uses a C style storage layout order, i.e., row major order. When compiling a language with a different storage layout order, suitable modification can be made to the parameterizable machine model. In some embodiments, each communication command is optimized separately. Given a communication command:

get/put $A[f(x,y)]$ from/to $B[g(x,y)]$ for $x \in \mathcal{D}(y)$ tag $t$;

$\mathcal{D}(y)$ is generally defined as a (d+p)-dimensional union of polyhedra, where p is the number immutable loop dimensions y, and d is the number of loop dimensions x that can be grouped into bulk communications. The order in which the iterations of the loops that correspond to immutable dimensions is not altered. When D(y) is a union of polyhedra, each polyhedron in the union can be optimized independently. The decomposition of D(y) into polyhedra is not unique. In one embodiment, the decomposition of D(y) results in a minimal number of polyhedra. In another embodiment, the decomposition results in a disjoint set of polyhedra, i.e., a minimal set of transferred elements. Hence transfers where D(y) is a polyhedron are considered. Every d-dimensional integer point x corresponds to the transfer of a single element of array A to an element of array B. From the description of the transfer as given by the transfer command, a set of c nested loops that execute the transfer in bulk is generated. In order to determine the order in which the bulk transfers in D(y) will occur, an ordered set $S=(s_1, \ldots, s_{(d-c)})$ of (d−c) linearly independent vectors is defined.

Let $x_0$ be a particular value of x in D(y). Let $M(x_0, y)$ be a subset of the transfers of D(y) defined by:

$$M(x_0, y) = \mathcal{D}(y) \cap S(x_0, y), x_0 \in \mathcal{D}(y) \cap Z^{d+p+1}$$

where $S(x_0, y)$ is the (d−c) dimensional subspace of $\mathbb{Q}^d$ that is spanned by a set of (d−c) vectors $S=(s_1, \ldots, s_{(d-c)})$, and contains point $x_o$. It is always possible to find an integer unimodular matrix V whose rightmost column vectors span $S\mathbb{Q}^{(d-c)}$ (proof uses Hermite normal form). Let $\mathcal{D}'$ be the image of $\mathcal{D}$ by $V^{-1}$, the inverse matrix of V. The (d−c) last variables of $\mathcal{D}'$ scan the image of the M's. Within a data set to be communicated, there is no legality constraint on the order in which the data should be communicated, so any unimodular V is legal.

Let $M'(x'_0, y)$ be the image of $M(x_0, y)$ through $V^{-1}$. Each distinct $M'(x'_0, y)$ is meant to be communicated at once by a single strided communication operation. Let $a(w)=a \cdot w + \alpha$ and $b(z)=b \cdot z + \beta$ be the storage functions for arrays A and B, where a and b are integer vectors, $\alpha$ is the base address of array A, $\beta$ is the base address of array B, and w and z are the coordinates of an array element of A and B respectively. The exact subset of addresses in array A that are accessed in the data transfer defined by $M'(x'_0, y)$ The exact data set M' can be communicated at once using a communication operation if $$m_a(x_1', \ldots, x_c') = \{(a_{c+1}, \ldots, a_d) \cdot (x_{c+1}', \ldots, x_d')^T | x' \in \mathcal{D}'(y)\}$$

and $$m_b(x_1', x_c') = \{(b_{c+1}, \ldots, b_d) \cdot (x_{c+1}', \ldots, x_d')^T | x' \in \mathcal{D}'(y)\}$$

are each defined by exactly one $\mathbb{Z}$-polyhedron for $x' \in \mathcal{D}'$. This condition, which is sufficient but not necessary, is always true in the case when (d−c)=1 and f(x, y) and g(x,y) are invertible. Hence, a heuristic for minimizing the number of communication operations is to find S that minimizes c. This would not take into account the number of data along S but only the number of data dimensions in each communication operation.

In general, $m_a$ is communicated onto $m_b$ for all the valid integer values of $(x'_1, x'_{c-1})$, in $\mathcal{D}'$. This set of valid values is basically the projection of $\mathcal{D}'$ on the subspace of variables $(x'_1, \ldots, x'_{c-1})$, which defines the iteration domain of the communication operation to be derived. If $m_a$ and $m_b$ are each one $\mathbb{Z}$-polyhedron, a base address and stride is computed for both sides as:

$$\text{base}(A, (x_1', \ldots, x_c')^T) = (a_1, \ldots, a_c)(x_1', \ldots, x_c')^T + \min(m_a(x_1, \ldots, x_c)) + \alpha$$

$$\text{base}(B, (x_1', \ldots, x_c')^T) = (b_1, \ldots, b_c)(x_1', \ldots, x_c')^T + \min(m_b(x_1, \ldots, x_c)) + \beta$$

The strides are given by the linear part of the supporting lattices of $m_a$ and $m_b$, which are constant across the values of y and $(x_1, \ldots, x_c)^T$ (up to the "center" of the lattice, which is not helpful with respect to strides and is accounted for in the base address).

The number of packets in the message is given by the Ehrhart polynomials of $m_a$ and $m_b$. If there is a bijection between $m_a$ and $m_b$, this number is the same. If not, it means that there are gather or scatter operations or both, and the number of transferred data may be ill-defined. If there is either a scatter or a gather involved, the number of packets is the maximum between the Ehrhart polynomials of $m_a$ and $m_b$. In some embodiments, instead of computing and comparing the Ehrhart polynomial explicitly, the Ehrhart polynomial of the reference that has the highest rank can be taken. Generally, the size of a packet is set to the size of the array element (assumed to be the same on both sides).

Special Cases

Big packets: When the size of $m_a$ and $m_b$ is independent of $(x_1, \ldots,$ and when they are both contiguous (their supporting lattice is $\mathbb{Z}$), each $m_a$ and $m_b$ can be considered as one packet and further data dimensions can be aggregated into the communication operation. In this case, the same process is performed on the iteration domain, by considering what is currently a message as a data element.

Strides not allowed on one side: When the communication layer used by the communication commands being generated does not allow strided communication on one side, a desirable option is to build messages made of contiguous data on that side. Without loss of generality, it is assumed that the side for which strided communication is not allowed is the side of array A. Hence, the column-vectors of S are chosen such that the last dimension of $fV^{-1}$ are the (d−c) last canonical vectors. For performance considerations, communicating contiguous data on one side is usually a good choice, even when there is no restriction on the communication layer used.

Strides not allowed on any sides: When strides are not allowed on both sides, unless there exists c and S such that the rightmost column-vectors of both $fV^{-1}$ and $gV^{-1}$ are the last canonical column-vectors, direct transfer is impossible. In this case, it is necessary to copy output data into a buffer with the right data layout before sending it and/or after receiving it. This buffered communication mode is called copy-and-communicate. As the amount of data to communicate is usually minimized, the sending side may copy its output data into a buffer, and the buffer is sent (and received) as a whole. The data is laid out as needed by the recipient (which is computed by the local memory optimization component). The generic communication operations are turned into copies to the local buffer, and a buffer_send( ) is issued. Normally, the recipient does not need to modify the layout of the incoming data, as it was laid out optimally for it by the sender.

Bijection between both sides: When the elements to be communicated between A and B are related by a bijection (one-to-one relation) it is easier to work on one of the images, i.e., $f(\mathcal{D}(y), y)$ or $g(\mathcal{D}(y), y)$. They are generally defined by a union of $\mathbb{Z}$-polyhedra, so it is possible to form communication commands with (d−c)=1 for each element of this union.

Simplifying the data transfers by transferring more: In some cases, communicating more data than necessary allows for producing simpler communication operations. It is important, however, to not update a value invalidly, which would break the program's semantics. Examples where enlarging the data set seems profitable include: interleaved messages whose union is a $\mathbb{Z}$-polyhedron; data sets with small data holes; and when the data set to be communicated can be overapproximated by a bounding hyper-rectangular box, and when the density of data in the box is high enough. The increase in the data to be communicated is a selectable system parameter that can be set to 50%, 60%, 75%, etc.

Optimizing for data transfer size: Some communication engines (e.g., DMA hardware engines) reach optimal performance when the message has a certain size. Also, certain communication libraries do not allow message sizes to exceed a given size. In either case, tiling can be applied to $\mathcal{D}$ ', in such a way that the number of data in the tile equal the optimal or maximal number of data. Typically, if the trip count of the innermost loop level is too short, more tiling levels may be used. In general, because the data can be sent in any order, tiling copy operations is generally legal. The $m_a$ and $m_b$ are then formed with the "intra-tile" loops.

Optimizing for memory banks: Many hardware memories are organized in banks. Data transfers are generally faster when successive data transfers are issued to different memory banks. Hence, in addition to forming messages with certain properties, it is desirable to schedule the communication operations in such a way that consecutive operations are issued on different memory banks. For this, the stride e at loop level c must be such that:

$$k*\text{bank\_size}*nb\_\text{banks}+\text{bank\_size}\leq e\leq (k+1)*\\(\text{bank\_size}*nb\_\text{banks})-\text{bank\_size}$$

where k is existentially quantified. As the full access function is defined by $a(f(Vx',y))$, i.e., $a \cdot f \cdot Vx'$, where $x_c'$ is incremented the corresponding stride in A is given by the $c^{th}$ columnvector of a f V. Formally, the constraint is then:

$$e=(afV_{\cdot c})$$

$$\exists k: (k\times\text{bank\_size}\times(nb\_\text{banks}+1))\leq e\leq ((k-1)\times\\\text{bank\_size}\times nb\_\text{banks})$$

Other constraints may also be taken into consideration. For example, V has to be full-rank. In particular, V it has to be independent of the subspace S spanning the message. Also, V has to be unimodular and its last (d−c) column-vectors must span S.

A constructive solution technique is employed to build a set of solutions to satisfy all of these constraints. In some embodiments, first k can be eliminated by using the maximum size of a message and computing $k_{min}$, the minimum k that makes $((k\times\text{bank\_size}\times(nb\_\text{banks}+1)))$ greater than the maximum transfer data set size supported by the underlying architecture. Then, let T defined by V=(T|S). A new $v_{\cdot c}$, denoted as $v'_{\cdot c}$, is defined as a combination of the vectors of V such that the resulting matrix, say V', is still unimodular. In other words, the relation V'=VU must hold, where U is integer unimodular. As the other column-vectors of V are not changed, U may be of the form:

$$U = \begin{pmatrix} 1 & 0 & \ldots & u_{1,c} & \ldots & 0 & 0 \\ 0 & 1 & \ldots & \vdots & \ldots & 0 & 0 \\ \vdots & & \ddots & \vdots & & & \vdots \\ \vdots & & & u_{c,c} & & & \vdots \\ \vdots & & & \vdots & \ddots & & \vdots \\ 0 & 0 & \ldots & \vdots & \ldots & 1 & 0 \\ 0 & 0 & \ldots & u_{d,c} & \ldots & 0 & 1 \end{pmatrix}$$

Unimodularity of U can be ensured by setting $u_{c,c}=1$. Thus, the problem becomes: build a linear combination $v'_{\cdot c}$ of the vectors of V such that:

$$k_{min}*\text{bank\_size}*nb\_\text{banks}+\text{bank\_size}\leq afVu_{\cdot c}\leq\\(k_{min}+1)*(\text{bank\_size}*nb\_\text{banks})-\text{bank\_size}$$

with $u_{c,c}=1$, which is a system of constraints with (d−1) free variables. Any solution is valid, even though to get clean code the coefficients of $u_{\cdot c}$ may be minimized. In some embodiments, the stride e may be set to a fixed value such as bank_size to make the constraint set simpler. This technique can find solutions if and only if the data set to be communicated spans more than one memory bank.

Interleaving data transfers for different communication operations: In some embodiments transfers of data that belong to different memory banks may be interleaved. This can be done by first computing the communication operations and their iteration domain, and then fusing loops of the same dimension and, if possible, of "similar" shapes, in order to limit the amount of control overhead that such fusion would entail.

Figure 9:
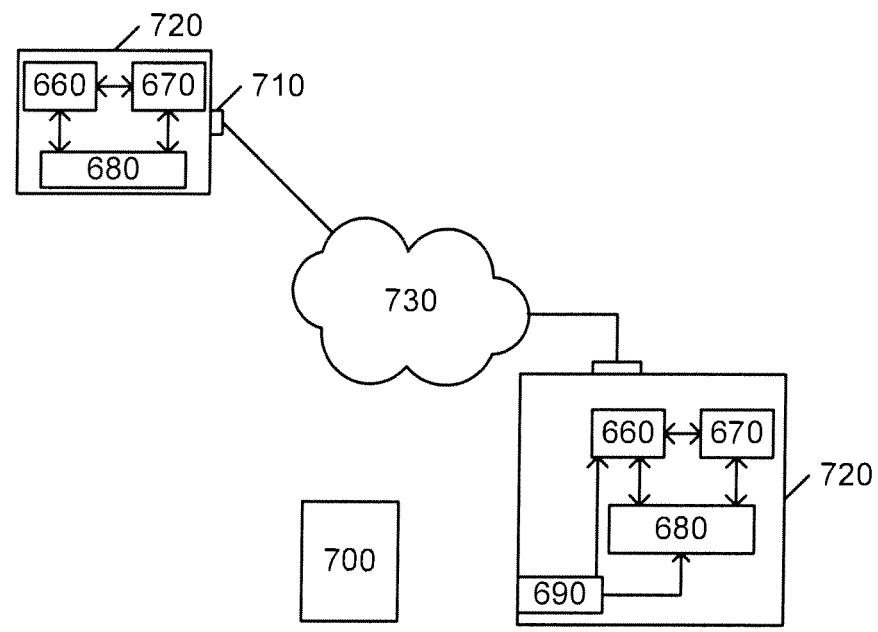
FIG. 9 illustrates a computing apparatus and computer software product consistent with provided embodiments.
Figure 9:
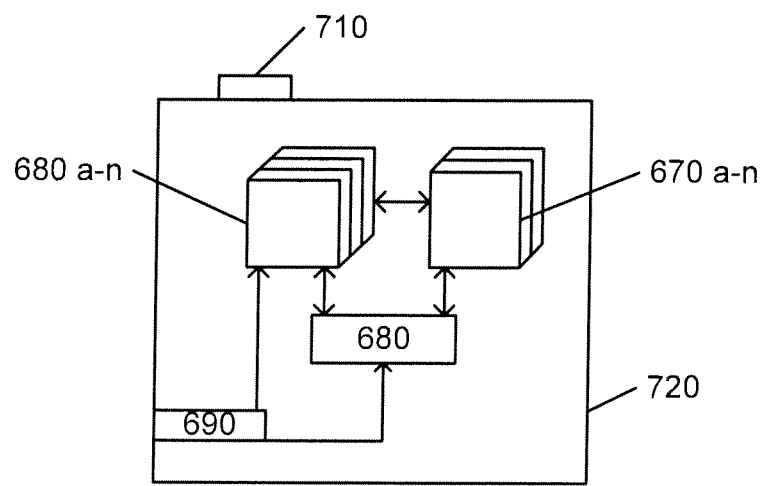

Illustrated in FIG. 9 are computing apparatus and computer software products consistent with provided embodiments. Computing apparatus 720 includes processor 660, memory 670, storage medium 680, and in some embodiments input port 690 and network interface 710. In many provided embodiments, storage medium 680 contains a set of processor executable instructions that when executed by processor 660 configure computing apparatus 720 to implement the modules and methods described herein. In one embodiment, storage medium 680, containing the set of processor executable instructions resides in another computing apparatus 720 across network 730. In an embodiment of a computer software product, computer software product 700 is a computer readable storage medium containing processor executable instructions sufficient that when executed by processor 660 configure computing apparatus 720 to implement the above described modules and methods. Further, computer software product, in some embodiments consists of a physical medium configured to interface with input port 690 to allow its contents to be copied to storage medium 680. In other embodiments, computer software product 700 is an internal storage medium, such as 680. An additional embodiment of computing apparatus 720 includes a plurality of processors 680(a-n), a plurality of memories 670(a-n), a storage medium 680 and in some embodiments input port 690 and network connection 710. In some embodiments, one or more processors 680(a-n) is a host, while others are modeled in the form of a grid.

Thus, it is seen that methods apparatus and computer software products for allocating arrays in memories with constrained memory requirements according to the way those arrays are accessed is provided. Specifically, methods and an apparatus for optimizing source code on a custom first computing apparatus for execution on a second computing apparatus, whereby data communications on the second computing apparatus are minimized are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of facilitating exchange of data between a first memory and a second memory, the method comprising:
deriving a data transfer operation for transferring a plurality of data elements, the data transfer operation lacking a specification of an iterator, and comprising: (a) a first data access specification describing source locations of the plurality of data elements in a first memory, (b) a number of data elements to be transferred in the data transfer operation, and (c) a second data access specification describing destination locations of the plurality of data elements in a second memory, by: (i) generating the first data access specification based on, at least in part, a structure of the plurality of data elements in the first memory and the number of data elements to be transferred, and (ii) generating the second data access specification based on, at least in part, a structure of the plurality of data elements in the second memory and the number of data elements to be transferred, for minimizing a parameter of a total data transfer of the group of data elements.

2. The method of claim 1, wherein at least one of the structure of the plurality of data elements in the first memory and the structure of the plurality of data elements in the second memory comprises at least one dimension and a sequence of indices corresponding to each dimension.

3. The method of claim 1, wherein the parameter comprises at least one of a number of data transfer operations required for the total data transfer, and a size of data to be transferred for the total data transfer.

4. The method of claim 1, wherein the plurality of data elements is based on, at least in part, a local memory compaction corresponding to a portion of a specified computation, the portion being designated to a processor associated with the memory.

5. The method of claim 4, wherein the local memory compaction corresponds to a minimum total data size, the method further comprising selecting the second plurality of data elements such that:
a size of the plurality of data elements is greater than the minimum total data size; and
at least one of: (i) the first data access specification comprises a first stride of a constant value, and (ii) the second data access specification comprises a second stride of a constant value.

6. The method of claim 1, wherein the plurality of data elements is at least one of processed and to be processed by the processor.

7. The method of claim 1, wherein:
the parameter comprises a number of data transfer operations required for the total data transfer;
a data transfer size corresponding to one data transfer operation is no greater than the size of data to be transferred for the total data transfer; and
at least one of generating the first data access specification and the second data access specification comprises selecting the data transfer size that minimizes the number of data transfer operations.

8. The method of claim 7, further comprising selecting the data transfer size corresponding to one data transfer operation based on, at least in part, a capacity of a communication link between the first and second memories.

9. The method of claim 1, wherein:
at least one of: (i) the first memory comprises a first set of memory banks, and (ii) the second memory comprises a second set of memory banks;
at least one of: (i) the first data access specification comprises a first stride of a constant value, and (ii) the second data access specification comprises a second stride of a constant value; and at least one of: (i) generating the first data access specification comprises selecting, based on at least in part, a number of banks in the first set and a size of a memory bank in the first set, the first stride such that consecutive data transfer operations correspond to distinct memory banks of the first set, and (ii) generating the second data access specification comprises selecting, based on at least in part, a number of banks in the second set and a size of a memory bank in the second set, the second stride such that consecutive data transfer operations correspond to distinct memory banks of the second set.

10. The method of claim 1, wherein:

the structure of the plurality of data elements comprises at least one dimension;

the structure of the plurality of data elements comprises at least one dimension; and at least one dimension of the structure of the plurality of data elements is smaller than a corresponding dimension of the structure of the plurality of data elements.

11. The method of claim 1, wherein:

the plurality of data elements comprises at least one set of data elements; and deriving the data transfer operation comprises computing: (i) a count representing a number of sets of data elements; and (ii) a size of each set of data elements.

12. The method of claim 11, wherein computing the size of a set of data elements comprises determining a size of a data element.

13. The method of claim 11, wherein computing at least one of the count and the size of a set of data elements is based on, at least in part, a capacity of a communication link between the first and second memories.

14. The method of claim 1, wherein:

the plurality of data elements comprises a plurality of sets of data elements;

the plurality of data elements comprises a plurality of corresponding sets of data elements; and deriving the data transfer operation comprises computing a first stride representing a distance between a first set of data elements in the plurality of data elements and a second set of data elements in the plurality of data elements.

15. The method of claim 14, wherein computing the first stride is based on, at least in part, a dimension of a structure of the plurality of data elements.

16. The method of claim 1, wherein:

the plurality of data elements comprises a plurality of sets of data elements;

the plurality of data elements comprises a plurality of corresponding sets of data elements; and deriving the data transfer operation comprises computing a second stride representing a distance between a first set of data elements in the plurality of data elements and a second set of data elements in the plurality of data elements.

17. The method of claim 16, wherein computing the second stride is based on, at least in part, a dimension of a structure of the plurality of data elements.

18. The method of claim 1, wherein deriving the data transfer operation comprises determining at least one of: (i) a start address in the first memory, and (ii) a starting address in the second memory.

19. The method of claim 1, wherein the plurality of data elements comprises a first dimension and a second dimension;

the plurality of data elements also comprises the first dimension and the second dimension; and deriving the data transfer operation comprises generating: (i) a start address in the first memory, based on, at least in part, the first dimension, and (ii) a start address in the second memory, based on, at least in part, the second dimension, such that a set of data elements in the plurality of data elements and a corresponding set of data elements in the plurality of data elements are arranged in the first and second dimensions, respectively.

20. The method of claim 1, further comprising transferring at least a portion of the plurality of data elements from the first memory to the second memory according to the data transfer operation, thereby storing the plurality of data elements in the second memory.

21. The method of claim 1, further comprising transferring the plurality of data elements from the second memory to the first memory according to the data transfer operation, thereby storing at least a portion of the plurality of data elements in the first memory.

22. The method of claim 1, wherein the step of deriving the data transfer operation is designated to a computer distinct from the processor.

23. The method of claim 22, wherein the computer is configured to derive a sequence of data transfer operations, the sequence comprising the data transfer operation, and each data transfer operation in the sequence corresponding to a loop index and being further based on, at least in part, the loop index.

24. The method of claim 22, wherein the computer is configured to derive a sequence of data transfer operations, the sequence comprising the data transfer operation, and each data transfer operation in the sequence: (i) corresponding to a distinct processor specified by a processor index, and (ii) being further based on, at least in part, the processor index.

25. A system for facilitating exchange of data between a first memory and a second memory, the system comprising:

a third memory comprising a structure of a plurality of data elements in the first memory and a structure of a plurality of data elements in the second memory, the second memory being associated with a first processor; and a second processor programmed to derive a data transfer operation for transferring a plurality of data elements, the data transfer operation lacking a specification of an iterator, and comprising: (a) a first data access specification describing source locations of the plurality of data elements in the first memory, (b) a number of data elements to be transferred in the data transfer operation, and (c) a second data access specification describing destination locations of a plurality of the plurality of data elements in the second memory, by: (i) generating the first data access specification based on, at least in part, a structure of the plurality of data elements in the first memory and the number of data elements to be transferred, and (ii) generating the second data access specification based on, at least in part, a structure of the plurality of data elements in the second memory and the number of data elements to be transferred, for minimizing a parameter of a total data transfer of the group of data elements.

26. The system of claim 25, wherein at least one of the structure of the plurality of data elements and the structure of the plurality of data elements comprises at least one dimension and a sequence of indices corresponding to each dimension.

27. The system of claim 25, wherein the parameter comprises at least one of a number of data transfer operations required for the total data transfer, and a size of data to be transferred for the total data transfer.

28. The system of claim 25, wherein the plurality of data elements is based on, at least in part, a local memory compaction corresponding to a portion of a specified computation, the portion being designated to a second processor associated with the second memory.

29. The system of claim 28, wherein the local memory compaction corresponds to a minimum total data size, and the first processor is further programmed to select the plurality of data elements such that:
   a size of the plurality of data elements is greater than the minimum total data size; and
   at least one of: (i) the first data access specification comprises a first stride of a constant value, and (ii) the second data access specification comprises a second stride of a constant value.

30. The system of claim 25, wherein the plurality of data elements is at least one of processed and to be processed by the second processor.

31. The system of claim 25, wherein:
   the parameter comprises a number of data transfer operations required for the total data transfer;
   a data transfer size corresponding to one data transfer operation is no greater than the size of data to be transferred for the total data transfer; and
   at least one of generating the first data access specification and the second data access specification comprises selecting the data transfer size that minimizes the number of data transfer operations.

32. The system of claim 31, wherein the first processor is further programmed to select the data transfer size corresponding to one data transfer operation based on, at least in part, a capacity of a communication link between the first and second memories.

33. The system of claim 25, wherein:
   at least one of: (i) the first memory comprises a first set of memory banks, and (ii) the second memory comprises a second set of memory banks;
   at least one of: (i) the first data access specification comprises a first stride of a constant value, and (ii) the second data access specification comprises a second stride of a constant value; and
   the first processor is further programmed to select at least one of: (i) the first stride, based on at least in part, a number of banks in the first set and a size of a memory bank in the first set, such that consecutive data transfer operations correspond to distinct memory banks of the first set, and (ii) the second stride, based on at least in part, a number of banks in the second set and a size of a memory bank in the second set, such that consecutive data transfer operations correspond to distinct memory banks of the second set.

34. The system of claim 25, wherein:
   the structure of the plurality of data elements comprises at least one dimension;
   the structure of the plurality of data elements comprises at least one dimension; and
   at least one dimension of the structure of the plurality of data elements is smaller than a corresponding dimension of the structure of the plurality of data elements.

35. The system of claim 25, wherein:
   the plurality of data elements comprises at least one set of data elements; and
   the first processor is further programmed to derive the data transfer operation by computing: (i) a count representing a number of sets of data elements; and (ii) a size of each set of data elements.

36. The system of claim 35, wherein to compute the size of a set of data elements the first processor is further programmed to determine a size of a data element.

37. The system of claim 35, wherein the first processor is programmed to compute at least one of the count and the size of a set of data elements is based on, at least in part, a capacity of a communication link between the first and second memories.

38. The system of claim 24, wherein:
   the plurality of data elements comprises a plurality of sets of data elements;
   the plurality of data elements comprises a plurality of corresponding sets of data elements; and
   the first processor is programmed to derive the data transfer operation by computing a first stride representing a distance between a first set of data elements in the plurality of data elements and a second set of data elements in the plurality of data elements.

39. The system of claim 38, wherein the first processor is programmed to compute the first stride based on, at least in part, a dimension of a structure of the plurality of data elements.

40. The system of claim 25, wherein:
   the plurality of data elements comprises a plurality of sets of data elements;
   the plurality of data elements comprises a plurality of corresponding sets of data elements; and
   the first processor is programmed to derive the data transfer operation by computing a second stride representing a distance between a first set of data elements in the plurality of data elements and a second set of data elements in the plurality of data elements.

41. The system of claim 40, wherein the first processor is programmed to compute the second stride is based on, at least in part, a dimension of a structure of the plurality of data elements.

42. The system of claim 25, wherein the first processor is programmed to derive the data transfer operation by determining at least one of: (i) a start address in the first memory, and (ii) a starting address in the second memory.

43. The system of claim 25, wherein
   the plurality of data elements comprises a first dimension and a second dimension;
   the plurality of data elements also comprises the first dimension and the second dimension; and
   the first processor is programmed to derive the data transfer operation by generating: (i) a start address in the first memory, based on, at least in part, the first dimension, and (ii) a start address in the second memory, based on, at least in part, the second dimension, such that a set of data elements in the plurality of data elements and a corresponding set of data elements in the plurality of data elements are arranged in the first and second dimensions, respectively.

44. The system of claim 25, further comprising the first memory, the second memory, and the second processor, the second processor being programmed to transfer at least a portion of the plurality of data elements from the first memory to the second memory according to the data transfer operation derived by the first processor, thereby storing the plurality of data elements in the second memory.

45. The system of claim 25, further comprising the first memory, the second memory, and the second processor, the second processor being programmed to transfer the plurality of data elements from the second memory to the first memory according to the data transfer operation derived by the first processor, thereby storing at least a portion of the plurality of data elements in the first memory.

46. The system of claim 25, wherein the second processor comprises the first processor.

47. The system of claim 25, wherein the first processor is programmed to derive a sequence of data transfer operations, the sequence comprising the data transfer operation, and each data transfer operation in the sequence corresponding to a loop index and being further based on, at least in part, the loop index.

48. The system of claim 25, wherein the first processor is programmed to derive a sequence of data transfer operations, the sequence comprising the data transfer operation, and each data transfer operation in the sequence: (i) corresponding to a distinct processor specified by a processor index, and (ii) being further based on, at least in part, the processor index.

49. An article of manufacture, comprising a non-transitory machine-readable medium storing instructions that, when executed by a machine comprising a memory unit and a processor in electronic communication with the memory unit, configure the machine, for facilitating exchange of data between a first memory and a second memory, to:

derive a data transfer operation for transferring a plurality of data elements, the data transfer operation lacking a specification of an iterator, and comprising: (a) a first data access specification describing source locations of the plurality of data elements in the first memory, (b) a number of data elements to be transferred in the data transfer operation, and (c) a second data access specification describing destination locations of the plurality of data elements in the second memory, the second memory being associated with a second processor, by: (i) generating the first data access specification based on, at least in part, a structure of the plurality of data elements in the first memory and the number of data elements to be transferred, and (ii) generating the second data access specification based on, at least in part, a structure of the plurality of data elements in the second memory and the number of data elements to be transferred, for minimizing a parameter of a total data transfer of the group of data elements.

50. The article of manufacture of claim 49, wherein the parameter comprises at least one of a number of data transfer operations required for the total data transfer, and a size of data to be transferred for the total data transfer.

* * * * *

UNITED STATES PATENT AND TRADEMARK OFFICE
CERTIFICATE OF CORRECTION

| | |
|---|---|
| PATENT NO. | : 9,858,053 B2 |
| APPLICATION NO. | : 14/181201 |
| DATED | : January 2, 2018 |
| INVENTOR(S) | : Richard A. Lethin et al. |

Page 1 of 1

It is certified that error appears in the above-identified patent and that said Letters Patent is hereby corrected as shown below:

In the Specification

At Column 1, Line 18, under the heading "GOVERNMENT INTEREST" Should Read:
-- This invention was made with government support under Contract No. F30602-03-C-0033 awarded by the Air Force Research Laboratory and DARPA, Contract No. W31P4Q-07-C-0147 awarded by the U.S. Army Aviation & Missile Command/DARPA, Contract No. FA8650-07-M-8129 awarded by the Air Force Research Laboratory, and Contract No. W9113M-07-C-0072 awarded by the U.S. Army Space & Missile Defense Command. The government has certain rights in the invention. --

Signed and Sealed this
Fifth Day of July, 2022

Katherine Kelly Vidal
*Director of the United States Patent and Trademark Office*